US011865493B2

(12) United States Patent
Al Muhsen

(10) Patent No.: US 11,865,493 B2
(45) Date of Patent: Jan. 9, 2024

(54) SYSTEM FOR FLARE GAS RECOVERY USING GAS SWEETENING PROCESS

(71) Applicant: Saudi Arabian Oil Company, Dhahran (SA)

(72) Inventor: Ahmed Khalifah Al Muhsen, Alhasa (SA)

(73) Assignee: Saudi Arabian Oil Company, Dhahran (SA)

( * ) Notice: Subject to any disclaimer, the term of this patent is extended or adjusted under 35 U.S.C. 154(b) by 502 days.

(21) Appl. No.: 17/194,753

(22) Filed: Mar. 8, 2021

(65) Prior Publication Data

US 2021/0187436 A1    Jun. 24, 2021

Related U.S. Application Data

(62) Division of application No. 15/951,432, filed on Apr. 12, 2018, now Pat. No. 10,981,104.

(51) Int. Cl.
*B01D 53/22* (2006.01)
*B01D 53/14* (2006.01)
(Continued)

(52) U.S. Cl.
CPC ..... *B01D 53/1462* (2013.01); *B01D 53/1406* (2013.01); *B01D 53/1425* (2013.01);
(Continued)

(58) Field of Classification Search
CPC ... F23G 2201/00; F23G 7/08; B01D 53/1493; B01D 2258/0283; B01D 53/75;
(Continued)

(56) References Cited

U.S. PATENT DOCUMENTS 3,563,695 A * 2/1971 Benson ................ B01D 53/526 423/232
3,823,222 A * 7/1974 Benson .............. B01D 53/1462 423/232

(Continued)

FOREIGN PATENT DOCUMENTS

CN    1817410    8/2006
CN    104815530   8/2015
(Continued)

OTHER PUBLICATIONS

GCC Examination Report in GCC Appln. No. GC 2018-35663, dated Jan. 12, 2021, 3 pages.
(Continued)

*Primary Examiner* — Anthony R Shumate
(74) *Attorney, Agent, or Firm* — Fish & Richardson P.C.

(57) ABSTRACT

A flare gas recovery system includes a primary gas sweetening unit; and a liquid-driven ejector in continuous fluid communication with the primary gas sweetening unit. The ejector includes an inlet configured to receive a motive fluid including a regenerable amine solvent in a rich state from the primary gas sweetening unit; a gas inlet configured to receive a suction fluid including a gas; and a fluid outlet configured to either directly or indirectly discharge to the primary gas sweetening unit a two-phase fluid including a mixture of the suction fluid and the amine solvent in a rich state.

20 Claims, 6 Drawing Sheets

(51) Int. Cl.
*B01D 53/18* (2006.01)
*B01D 53/52* (2006.01)
*B01D 53/62* (2006.01)
*B01D 53/75* (2006.01)
*B01D 53/78* (2006.01)
*B01D 53/96* (2006.01)
*F23G 7/08* (2006.01)

(52) U.S. Cl.
CPC ....... *B01D 53/1493* (2013.01); *B01D 53/185* (2013.01); *B01D 53/526* (2013.01); *B01D 53/62* (2013.01); *B01D 53/75* (2013.01); *B01D 53/78* (2013.01); *B01D 53/96* (2013.01); *F23G 7/08* (2013.01); *B01D 2252/204* (2013.01); *B01D 2258/0283* (2013.01); *F23G 2201/00* (2013.01)

(58) Field of Classification Search
CPC .......... B01D 2252/204; B01D 53/1425; B01D 53/1462; B01D 53/96; B01D 53/78; B01D 53/1406; B01D 53/526; B01D 53/62; B01D 53/185
See application file for complete search history.

(56) References Cited

U.S. PATENT DOCUMENTS

| | | | | |
|---|---|---|---|---|
| 4,073,863 | A * | 2/1978 | Giammarco | B01D 53/1406 423/243.1 |
| 4,830,838 | A * | 5/1989 | Kent | C01B 17/60 423/576.5 |
| 4,997,630 | A * | 3/1991 | Wagner | C10K 1/143 423/229 |
| 5,173,213 | A | 12/1992 | Miller | |
| 9,657,247 | B2 | 5/2017 | Zink | |
| 10,974,194 | B2 | 4/2021 | Al Muhsen | |
| 2007/0148069 | A1 | 6/2007 | Chakravarti | |
| 2009/0241778 | A1 | 10/2009 | Lechnick et al. | |
| 2010/0256347 | A1* | 10/2010 | Bublitz | C01B 6/04 423/325 |
| 2011/0217218 | A1 | 9/2011 | Gupta et al. | |
| 2012/0051989 | A1* | 3/2012 | Wagner | B01D 53/1493 423/210 |
| 2012/0238793 | A1 | 9/2012 | Cullinane | |
| 2013/0213230 | A1 | 8/2013 | Haari | |
| 2014/0275693 | A1 | 9/2014 | Zink | |
| 2015/0251129 | A1* | 9/2015 | Heirman | B01D 53/80 95/190 |
| 2016/0144314 | A1* | 5/2016 | Gonnard | B01D 53/1493 95/173 |
| 2016/0206992 | A1* | 7/2016 | Laroche | B01D 53/1493 |
| 2016/0265322 | A1 | 9/2016 | Beg | |
| 2019/0022580 | A1 | 1/2019 | Muhsen | |
| 2019/0262768 | A1* | 8/2019 | Katz | C01B 3/52 |
| 2019/0314755 | A1* | 10/2019 | Al Muhsen | B01D 53/1406 |
| 2020/0078730 | A1 | 3/2020 | Melin et al. | |
| 2021/0008497 | A1 | 1/2021 | Al Muhsen | |
| 2021/0354077 | A1* | 11/2021 | Ingels | B01D 53/1493 |

FOREIGN PATENT DOCUMENTS

| | | |
|---|---|---|
| CN | 105228723 | 1/2016 |
| CN | 205412608 | 8/2016 |
| RU | 45291 | 5/2005 |
| WO | 2019018183 | 1/2019 |

OTHER PUBLICATIONS

GCC Examination Report in GCC Appln. No. GC 2019-37356, dated Apr. 19, 2020, 4 pages.

GCC Examination Report in GCC Appln. No. GC 2018-35663, dated May 31, 2020, 3 pages.

PCT International Search Report and Written Opinion in International Application No. PCT/US2019/023841, dated Jul. 2, 2019, 16 pages.

PCT International Search Report and Written Opinion in International Application No. PCT/US2018/041675, dated Nov. 15, 2018, 15 pages.

Leagas et al., "Ejector Technology for Efficient and Cost Effective Flare Gas Recovery"; Proceedings of the GPA-GCC 24th Annual Technical Conference, Kuwait City, Kuwait, May 10-11, 2016, 10 pages.

Reddick et al., "Lowering the energy cost of carbon dioxide capture using ejectors for waste heat upgrading." Energy Procedia, vol. 63, Jan. 1, 2014, 12 pages.

Sonawat et al., "Flare Gas Recovery Using Ejector—A Review", Proceedings of the Thirty Ninth National Conference on Fluid Mechanics and Fluid Power, December 13-15, SVNIT Surat, Gujarat, India, paper FMFP201282, 8 pages.

Extended European Search Report issued in European Appln. 21176320.6, dated Sep. 16, 2021, 9 pages.

CN Office Action issued in Chinese Appln. No. 201980038781.4, dated Apr. 13, 2022, 27 pages (With English Translation).

EPO Communication Pursuant to Article 94(3) EPC in European Appln. No. 19715795.1, dated Jan. 4, 2023, 3 pages.

* cited by examiner

SYSTEM FOR FLARE GAS RECOVERY USING GAS SWEETENING PROCESS

CROSS-REFERENCE TO RELATED APPLICATION

This application is a divisional of and claims priority to U.S. patent application Ser. No. 15/951,432, filed on Apr. 12, 2018, the entire contents of which are incorporated by reference herein.

TECHNICAL FIELD

This disclosure relates to systems and methods that integrate a flare gas recovery process with a gas sweetening process used in oil and gas refining.

BACKGROUND

Many industrial plants around the world utilize gas flares primarily to burn off waste gas that is released by safety valves. The safety valves can open during planned events, such as plant startup and shutdown, or during an unplanned event during processing, for example, to prevent over-pressuring in industrial plant equipment. By burning the waste gas, the flare breaks down waste gas into compounds that are more environmentally friendly when released into the atmosphere as well as prevents large volumes of flammable gas to be blown by wind to areas that can potentially cause safety issues.

In a flare, a continuous flow of waste gas is provided to the gas flare to maintain a constant flame. If the flare tip loses its flame, the flare will fail to burn the waste gas and the waste gas will simply discharge into the atmosphere. Because the flare discharges combusted gases to the atmosphere, an associated piping system called a flare header, which routes fluids to the flare, normally operates a little above atmospheric pressure. The waste gas that enters the flare header has a pressure that is too low to be of practical use in an oil and gas refining plant.

SUMMARY

This document relates to systems and methods that integrate a flare gas recovery process with a gas sweetening process used in oil and gas refining. In particular, this specification describes a system and method of utilizing liquid amine solvent from a gas sweetening unit as motive fluid for an ejector for application in flare gas recovery.

The present disclosure includes one or more of the following units of measure with their corresponding abbreviations, as shown in Table 1:

TABLE 1

| Unit of Measure | Abbreviation |
| --- | --- |
| Degrees Fahrenheit | °F. |
| Parts per million | ppm |
| Pounds per square inch (pressure) | psi |
| Pounds per square inch gauge (pressure) | psig |
| One million | MM |
| Standard cubic feet per day | SCFD |
| gallons per minute | gpm (U.S. measure) |
| Mole | mol |

Oil refineries and gas processing facilities across the world can produce large amounts of waste gas. Flare gas recovery systems can be installed to recover this waste gas.

A flare gas recovery process is a process that reutilizes a waste gas as a fuel gas when typically, the waste gas would be sent to a gas flare for disposal. Recovering waste gas can save operation costs associated with purchased fuel because some or all of the recovered flare gas can be used as fuel. Furthermore, flare gas recovery systems can reduce emissions and increase the life of the flare tip. If the recovered flare gas is further processed and cleaned, the flare gas can even be acceptable for venting. Flare gas recovery systems can include equipment to compress the waste gas so that the gas can be recycled back to the plant. However, instead of using multi-stage compressors, which are typically associated with high capital costs due to associated equipment, installation, and high operation costs, the systems and method described in this document use another option for compressing flare gas—which is to employ ejectors.

Ejectors rely on a Venturi effect to pressurize flare gas by utilizing available pressure from a fluid called a motive fluid. Ejectors are considered static equipment and are generally associated with low capital and operating costs in comparison to compressors. The ejector converts the pressure energy available in the motive fluid to velocity energy, brings in the low pressure suction fluid, mixes the two fluids, and discharges the mixture at an intermediate pressure without the use of rotating or moving parts.

In some embodiments, a liquid-driven ejector can be integrated with a flare gas recovery system. Such systems are more complicated than systems that use vapor-driven ejectors because of the need to separate the liquid and vapor phases downstream of the ejector. The advantage of a liquid-driven ejector, however, is that the liquid can be pumped and recycled as motive fluid, resulting in a net discharge of only the recovered flare gas and therefore, having significantly less impact on downstream units. Water is a viable option for motive fluid, but utilizing water introduces additional issues, such as water treatment and special materials to handle sour water, corrosion issues, and additional filtration needs. The integration and utilization of available solvent from the gas sweetening unit therefore provides the advantages of avoiding the issues associated with water-driven ejectors, while also adding the capability of cleaning the flare gas before recycling it back to the facility.

In an example implementation, a flare gas recovery system includes a primary gas sweetening unit; and a liquid-driven ejector in continuous fluid communication with the primary gas sweetening unit. The ejector includes an inlet configured to receive a motive fluid including a regenerable amine solvent in a rich state from the primary gas sweetening unit; a gas inlet configured to receive a suction fluid including a gas; and a fluid outlet configured to either directly or indirectly discharge to the primary gas sweetening unit a two-phase fluid including a mixture of the suction fluid and the amine solvent in a rich state.

In an aspect combinable with the example implementation, the amine solvent interacts with one or more components of the suction fluid in the ejector, the one or more components include hydrogen sulfide, carbon dioxide, or both.

In another aspect combinable with any one of the previous aspects, the amine solvent interacts with one or more components of gas by chemical binding, physical binding, or both, to produce the amine solvent in the rich state from the motive fluid and a gas configured for gas sweetening feed, combustion, venting, or flaring from the suction fluid.

Another aspect combinable with any one of the previous aspects further includes a filtration package to remove impurities from the solvent, wherein the impurities include corrosion particles or salts that form in the system during operation.

Another aspect combinable with any one of the previous aspects further includes a circulation pump to supply flow of the motive fluid from the primary gas sweetening unit to the ejector.

Another aspect combinable with any one of the previous aspects further includes a separator to separate the two-phase fluid into a rich solvent liquid phase and a sweetened gas vapor phase.

Another aspect combinable with any one of the previous aspects further includes a secondary gas sweetening unit operating at a lower pressure than the primary gas sweetening unit, wherein the rich solvent liquid phase from the separator is cycled back to the primary gas sweetening unit, and the sweetened gas vapor phase from the separator is delivered as feed to the secondary gas sweetening unit.

Another aspect combinable with any one of the previous aspects further includes a booster pump to pressurize the motive fluid to the ejector to meet operating conditions of the secondary gas sweetening unit.

In another aspect combinable with any one of the previous aspects, the suction fluid includes a flare gas from a source including a main flare header, upstream of a flashback protection device.

In another aspect combinable with any one of the previous aspects, the suction fluid includes a flare gas from a source including one or more of emergency valves in the primary gas sweetening unit or a main flare header, upstream of a flashback protection device.

In another example implementation, a method of supplying flare gas for a flare gas recovery system includes supplying a flow of flare gas to an ejector of the flare gas recovery system; supplying a continuous flow of regenerable amine solvent in a rich state to the ejector from a primary gas sweetening unit that is in fluid communication with the flare gas recovery system; and combining the flare gas and solvent together in the ejector to form a two-phase fluid, where the continuous flow of the solvent is configured to increase pressure of the flare gas to allow for delivery of the two-phase fluid either directly or indirectly back to the primary gas sweetening unit.

In an aspect combinable with the example implementation, combining of the flare gas and solvent causes removal of a portion of one or more components from the gas, the one or more components including hydrogen sulfide or carbon dioxide, by chemical binding, physical binding, or both, thereby resulting in the two-phase fluid including of the solvent in a rich state and the gas suitable for one or more of gas sweetening feed, combustion, venting, and flaring.

Another aspect combinable with any one of the previous aspects further includes filtering of the solvent to remove impurities, the impurities including corrosion particles or salts.

In another aspect combinable with any one of the previous aspects, supplying the solvent in rich state is provided by a pressure source, the pressure source including booster pumps designated for the flare gas recovery system, to meet operating conditions of a secondary gas sweetening unit.

In another aspect combinable with any one of the previous aspects, supplying the solvent in rich state is provided by a pressure source, the pressure source including circulation pumps in the primary gas sweetening unit or additional circulation pumps designated for the flare gas recovery system.

Another aspect combinable with any one of the previous aspects further includes separating the two-phase fluid into a rich solvent liquid phase and a sweetened gas vapor phase.

Another aspect combinable with any one of the previous aspects further includes cycling the liquid phase back to the primary gas sweetening unit, and delivering the vapor phase to a secondary gas sweetening unit.

In another aspect combinable with any one of the previous aspects, supplying the flow of flare gas to the ejector includes supplying gas from a main flare header, upstream of a flashback protection device.

In another aspect combinable with any one of the previous aspects, supplying the flow of flare gas to the ejector includes supplying gas from one or more of emergency valves in the primary gas sweetening unit or a main flare header, upstream of a flashback protection device.

In another example implementation, a flare gas recovery system includes a primary gas sweetening unit; and a liquid-driven ejector in continuous fluid communication with the primary gas sweetening unit. The ejector includes an inlet configured to receive a motive fluid including a regenerable amine solvent in a lean state from the primary gas sweetening unit; a gas inlet configured to receive a suction fluid including a gas; and a fluid outlet configured to either directly or indirectly discharge to the primary gas sweetening unit a two-phase fluid including a mixture of the suction fluid and the amine solvent in a rich state.

In an aspect combinable with the example implementation, the liquid-driven ejector includes a first liquid-driven ejector.

Another aspect combinable with any one of the previous aspects further includes a second liquid-driven ejector in continuous fluid communication with the primary gas sweetening unit.

In another aspect combinable with any one of the previous aspects, the second liquid-driven ejector includes an inlet configured to receive a motive fluid including a lean or sour gas stream; a gas inlet configured to receive a suction fluid including a flare gas; and a fluid outlet configured to either directly or indirectly discharge to the first liquid-driven ejector a two-phase fluid including a mixture of the suction fluid and motive fluid.

In another aspect combinable with any one of the previous aspects, the two-phase fluid includes primarily flare gas.

In another aspect combinable with any one of the previous aspects, the amine solvent interacts with one or more components of the suction fluid in the ejector, the one or more components include hydrogen sulfide, carbon dioxide, or both.

In another aspect combinable with any one of the previous aspects, the amine solvent interacts with one or more components of gas by chemical binding, physical binding, or both, to produce the amine solvent in the rich state from the motive fluid and a gas configured for gas sweetening feed, combustion, venting, or flaring from the suction fluid.

Another aspect combinable with any one of the previous aspects further includes a filtration package to remove impurities from the solvent, wherein the impurities include corrosion particles or salts that form in the system during operation.

Another aspect combinable with any one of the previous aspects further includes a circulation pump to supply flow of the motive fluid from the primary gas sweetening unit to the ejector; and a separator to separate the two-phase fluid into a rich solvent liquid phase and a sweetened gas vapor phase.

Another aspect combinable with any one of the previous aspects further includes a secondary gas sweetening unit operating at a lower pressure than the primary gas sweetening unit, wherein the rich solvent liquid phase from the separator is cycled back to the primary gas sweetening unit, and the sweetened gas vapor phase from the separator is delivered as feed to the secondary gas sweetening unit.

Another aspect combinable with any one of the previous aspects further includes a booster pump to provide adequate pressure to the motive fluid to the ejector, to meet operating conditions of the secondary gas sweetening unit.

In another aspect combinable with any one of the previous aspects, the suction fluid includes a flare gas from a source including a main flare header, upstream of a flashback protection device.

In another aspect combinable with any one of the previous aspects, the suction fluid includes a flare gas from a source including one or more of emergency valves in the primary gas sweetening unit or a main flare header, upstream of a flashback protection device.

In another example implementation, a method of supplying flare gas for a flare gas recovery system includes supplying a flow of flare gas to a flare gas ejector of the flare gas recovery system; supplying a continuous flow of a lean or sour gas stream to the ejector; combining the flare gas and lean or sour gas stream together in the ejector to form a mixed gas fluid, supplying a flow of the mixed-gas fluid to an amine ejector of a gas sweetening unit; supplying a continuous flow of regenerable amine solvent in a lean state to the amine ejector from the primary gas sweetening unit that is in fluid communication with the flare gas recovery system; and combining the mixed-gas fluid and solvent together in the amine ejector to form a two-phase fluid, where the continuous flow of the solvent is configured to increase pressure of the mixed-gas fluid to allow for delivery of the two-phase fluid either directly or indirectly back to the primary gas sweetening unit.

In an aspect combinable with the example implementation, combining of the mixed-gas fluid and solvent causes removal of a portion of one or more components from the mixed-gas, the one or more components including hydrogen sulfide or carbon dioxide, by chemical binding, physical binding, or both, thereby resulting in the two-phase fluid including of the solvent in a rich state and the gas suitable for one or more of gas sweetening feed, combustion, venting, and flaring.

Another aspect combinable with any one of the previous aspects further includes filtering of the solvent to remove impurities, the impurities including corrosion particles or salts.

In another aspect combinable with any one of the previous aspects, supplying the solvent in lean state is provided by a pressure source, the pressure source including circulation pumps in the primary gas sweetening unit or additional circulation pumps designated for the flare gas recovery system.

Another aspect combinable with any one of the previous aspects further includes separating the two-phase fluid into a rich solvent liquid phase and a sweetened gas vapor phase.

Another aspect combinable with any one of the previous aspects further includes cycling the liquid phase back to the primary gas sweetening unit, and delivering the vapor phase to a secondary gas sweetening unit.

In another aspect combinable with any one of the previous aspects, supplying the lean solvent is further assisted by an additional pressure source, the pressure source including booster pumps designated for the flare gas recovery system, to meet operating conditions of the secondary gas sweetening unit.

In another aspect combinable with any one of the previous aspects, supplying the flow of flare gas to the flare gas ejector includes supplying gas from a main flare header, upstream of a flashback protection device.

In another aspect combinable with any one of the previous aspects, supplying the flow of flare gas to the flare gas ejector includes supplying gas from one or more of emergency valves in the primary gas sweetening unit or a main flare header, upstream of a flashback protection device.

The subject matter described in this specification can be implemented in particular implementations, so as to realize one or more of the following advantages. The integrated processes and systems described in this document can provide an alternative to using a gas flare system, or another waste gas disposal system, which allows a gas refinery company to meet certain quality and regulatory emissions standards. The integrated systems and methods described in this document can reduce capital and operating costs by reducing the need for additional power and equipment, such as a knockout vessel and a cooler, in comparison to existing systems that recover waste gases. The integrated systems and methods described in this document can reduce capital and operating costs by reducing the need for additional processing, such as cooling or removing acid gas. The integrated systems and processes described in this document can require less area in comparison to existing systems used for disposing waste gases. Although the gas could be treated when passing through the ejector and subsequently sent to an end user, certain embodiments of the integrated systems and processes described in this document recycle waste gas back to the process to reduce net production of waste gas. For example, in some embodiments, the gas from an ejector outlet can be routed back to an amine unit in the system. The integrated systems and methods described in this document provide additional capability to clean recovered flare gas by nature of the chosen motive fluid. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DETAILED DESCRIPTION

This document describes systems and methods that integrate a flare gas recovery unit with a gas sweetening unit, and is presented to enable any person skilled in the art to make and use the disclosed subject matter in the context of one or more particular implementations.

After crude oil or natural gas is extracted, it must be refined to produce commercial fuels and other products. Oil or gas that contains significant amounts of sulfur compounds like hydrogen sulfide is considered "sour," and oil refineries and gas processing plants utilize "sweetening" processes to remove these sulfur compounds. Gas sweetening units typically utilize an aqueous solution of amine solvent to remove hydrogen sulfide and carbon dioxide from sour gas.

Figure 1:
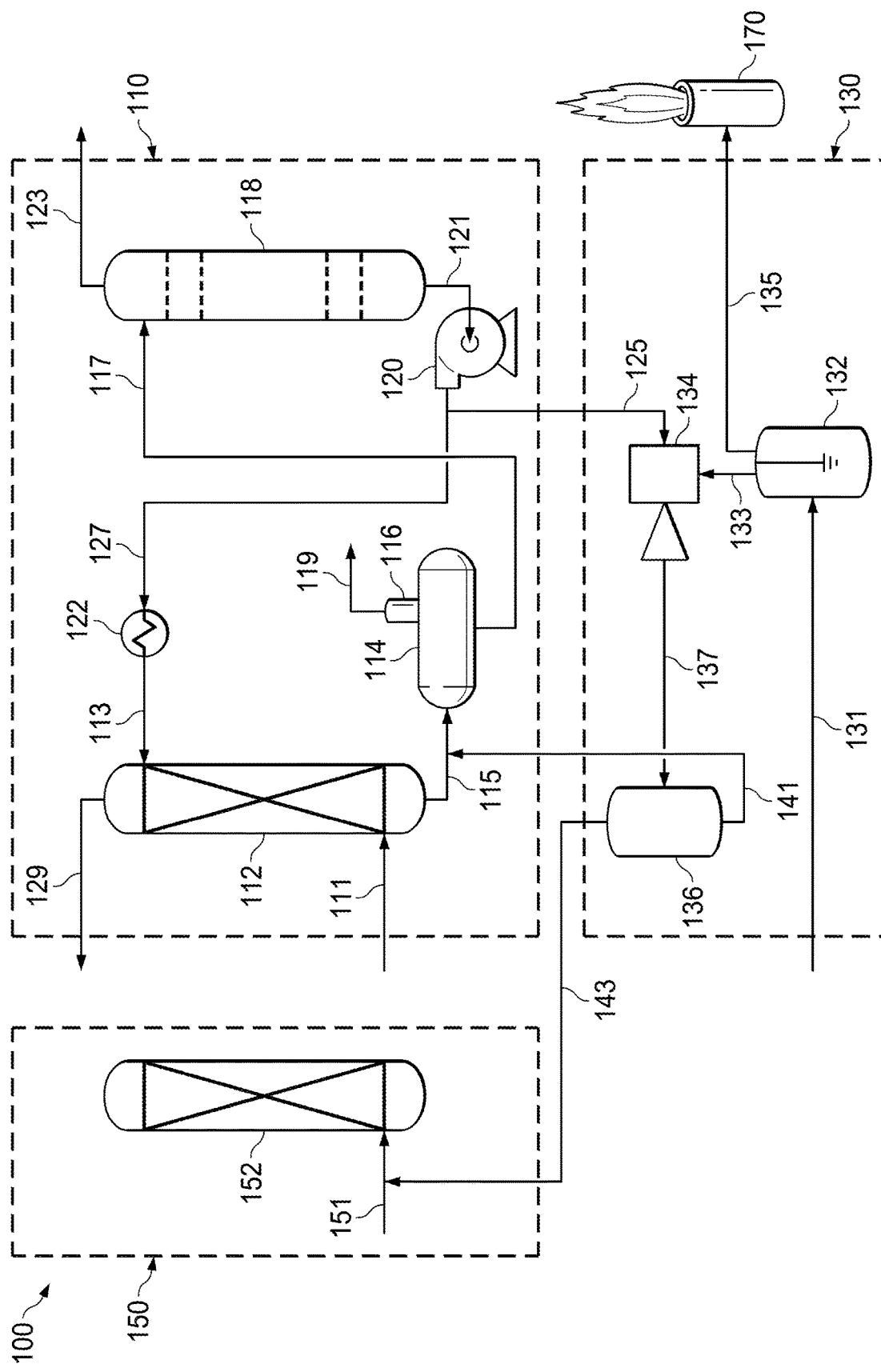
FIG. 1 is a schematic diagram of an example system that includes a flare gas recovery unit and two gas sweetening units.

FIG. 1 depicts a general schematic of a first exemplary system 100 that includes a primary gas sweetening unit 110 and flare gas recovery system 130. The primary gas sweetening unit 110 of FIG. 1 comprises an amine contactor 112, a flash drum 114, an amine stripper 118, an amine circulation pump 120, and an amine cooler 122. The amine contactor 112 is a counter-flow gas-liquid contactor that can be referred as an absorber, treater, or scrubber. The amine contactor 112 is a vessel comprising internal components, which can include trays or packing, to increase gas-liquid contact.

The flash drum 114 operates at a lower pressure than the contactor 112 and allows light hydrocarbons to flash (that is, evaporate) from the amine solvent. The flash drum 114 is sized for liquid surge, liquid holdup, and residence time for vapor to separate from the liquid amine solvent. In some embodiments, the flash drum 114 is equipped with a tower 116. The flash drum tower 116 can remove acid gas such as hydrogen sulfide, which can be present in the vapor separated from the amine solvent, before the vapor is sent to another downstream process or end user.

Still referring to FIG. 1, the amine stripper 118 is a vessel, which can also be referred to as a regenerator. The amine stripper 118 comprises internal components, for example, trays or packing, and effectively serves as a distillation tower to boil off acid gas to regenerate the amine solvent. The distinction between acid gas and sour gas is that sour gas is mostly hydrocarbons with some acidic gas content, and acid gas contains little to no hydrocarbons.

The circulation pump 120 pressurizes the regenerated amine solvent to recycle the amine solvent back to the contactor 112. The circulation pump 120 can comprise a single pump or multiple pumps in parallel or in series. The circulation pump 120 can be sized to accommodate upset scenarios which require much higher flow rates than is normally required by the primary gas sweetening unit 110. The circulation pump 120, as depicted in FIG. 1, employs a recycle line which routes a portion of the amine solvent back to the suction of the pump 120.

The amine cooler 122 brings the temperature of the solvent down before the solvent is recycled back to the contactor 112. The lower solvent temperature increases the efficiency of cleaning the sour gas that enters the contactor 112. The cooler 122 can be a shell-and-tube heat exchanger, an air cooler, or a combination of multiples of both.

Gas sweetening units can optionally comprise auxiliary and variant equipment such as additional heat exchangers and vessels that have not been described above, but a majority of gas sweetening units across the world implement some variation or combination of the major equipment outlined.

Gas sweetening units can operate at a variety of operating temperatures and pressures. In some embodiments, sour gas at a temperature of between 70-130° F. via stream 111 enters the bottom of an amine contactor 112, as amine solvent at a temperature of between 80-140° F. via stream 113 enters from the top. The amine solvent that enters the amine contactor 112 is at least approximately 10° F. hotter than the sour gas that enters the amine contactor 112. As the amine solvent contacts the sour gas, the solvent removes (or "cleans") the sulfur compounds, carbon dioxide, and other contaminants from the sour gas, by chemical and physical binding. Once the solvent has passed through contactor 112, the solvent is considered to be in a "rich" state—also referred as "rich solvent"-because the solvent contains the hydrogen sulfide removed from the sour gas. The sweetened gas exits from the top of contactor 112 via stream 129, and rich solvent exits from the bottom via stream 115. The sweetened gas (stream 129) can contain approximately 5-60 ppm hydrogen sulfide and is sent downstream for sale or further processing. Rich solvent 115 is sent to a flash drum 114 operating between atmospheric pressure to 90 psig, where any flashed vapor travels up a flash drum tower 116 and exits via stream 119, where the flashed vapor can then be utilized as fuel, vented, flared, or a combination of these.

Rich solvent liquid 117 from flash drum 114 is sent to an amine stripper 118 with a top operating pressure between 5-17 psig. The hydrogen sulfide and carbon dioxide is boiled off via heat input to the bottom of stripper 118 operating between 230-270° F. in order to regenerate the amine solvent. The regenerated solvent is then considered to be in a "lean" state—also referred as "lean solvent"—that is once again suitable to be used for cleaning additional sour gas. Sour gas 123, comprising hydrogen sulfide and carbon dioxide exits the top of stripper 118, and lean solvent 121 is pumped out of the bottom of stripper 118 by circulation pump 120. Lean solvent 127 is cooled in heat exchanger 112 to approximately 80-140° F. before re-entering contactor 112 to be used again to clean additional sour gas. The transport of vapor and liquid within, to, and from the gas sweetening unit 110 can be achieved using various piping, pump, and valve configurations.

Still referring to FIG. 1, the exemplary system 100 includes the flare gas recovery system 130 that is integrated with the gas sweetening unit 110, as described above. The system 100 utilizes liquid amine solvent 125 from the gas sweetening unit 110 as motive fluid for an ejector in the flare gas recovery system 130.

The flare gas recovery system 130 includes an ejector 134 that comprises an inlet that continuously receives the regenerable amine solvent, which serves as a high-pressure motive fluid from the gas sweetening unit 110 via stream 125. The ejector 134 also comprises a gas inlet configured for receiving a flare gas 133 as a low-pressure suction fluid. The motive fluid operates at a higher pressure than the suction fluid. For example, the amine solvent (motive fluid) operates at approximately 990 psig, and the flare gas (suction fluid) operates at approximately 0.5 psig. The motive and suction fluid mix within the ejector 134, and then discharge at an intermediate pressure. Because the motive fluid is amine solvent 125 from the gas sweetening unit 110, the motive fluid is capable of removing hydrogen sulfide and carbon dioxide from the flare gas.

FIG. 1 shows a certain implementation in which the suction gas of the ejector 134 is supplied by a flare header 131 via stream 133. System 100 can include a secondary gas sweetening unit 150 (including a secondary amine contactor 152), which operates at a lower pressure than the primary gas sweetening unit 110. The ejector 134 can be installed near the flare header 131 and utilize amine solvent from a nearby gas sweetening unit, such as the primary gas sweetening unit 110, as motive fluid to mix with and pressurize flare gas. The two-phase mixture 137 can be discharged to a separator 136, where vapor phase 143 is separated from liquid phase 141 of the mixture. The liquid phase includes rich solvent and can be recycled back to the primary gas sweetening unit 110 and returned to a flash drum 114 via stream 141. The vapor phase 143 includes sweetened gas and can be delivered as additional feed (for example, in addition to the feed 151 to the secondary amine contactor 152) to the secondary gas sweetening unit 150. The type of system shown in FIG. 1 can be applicable when there exists at least two gas sweetening units operating at different pressures. In some implementations, a booster pump is included to provide adequate pressure to the amine solvent from the primary gas sweetening unit 110 which is being utilized as motive fluid for the ejector 134, so that the recovered flare gas can be sent to the secondary gas sweetening unit 150.

The flare gas recovery system 130 design takes into consideration the integrated operation with the flare 170, which includes flashback prevention 132. Flashback prevention involves preventing reverse flow of gas and potentially, the flame from the flare, as flare gas 135 is being burned at the flare 170. Flashback prevention can comprise a liquid seal drum, a molecular seal, a fluidic seal, a flame arrestor, or any combination thereof. The source of flare gas to the ejector 134 (or analogous 234, 334) is upstream of the flashback prevention 132.

Figure 2:
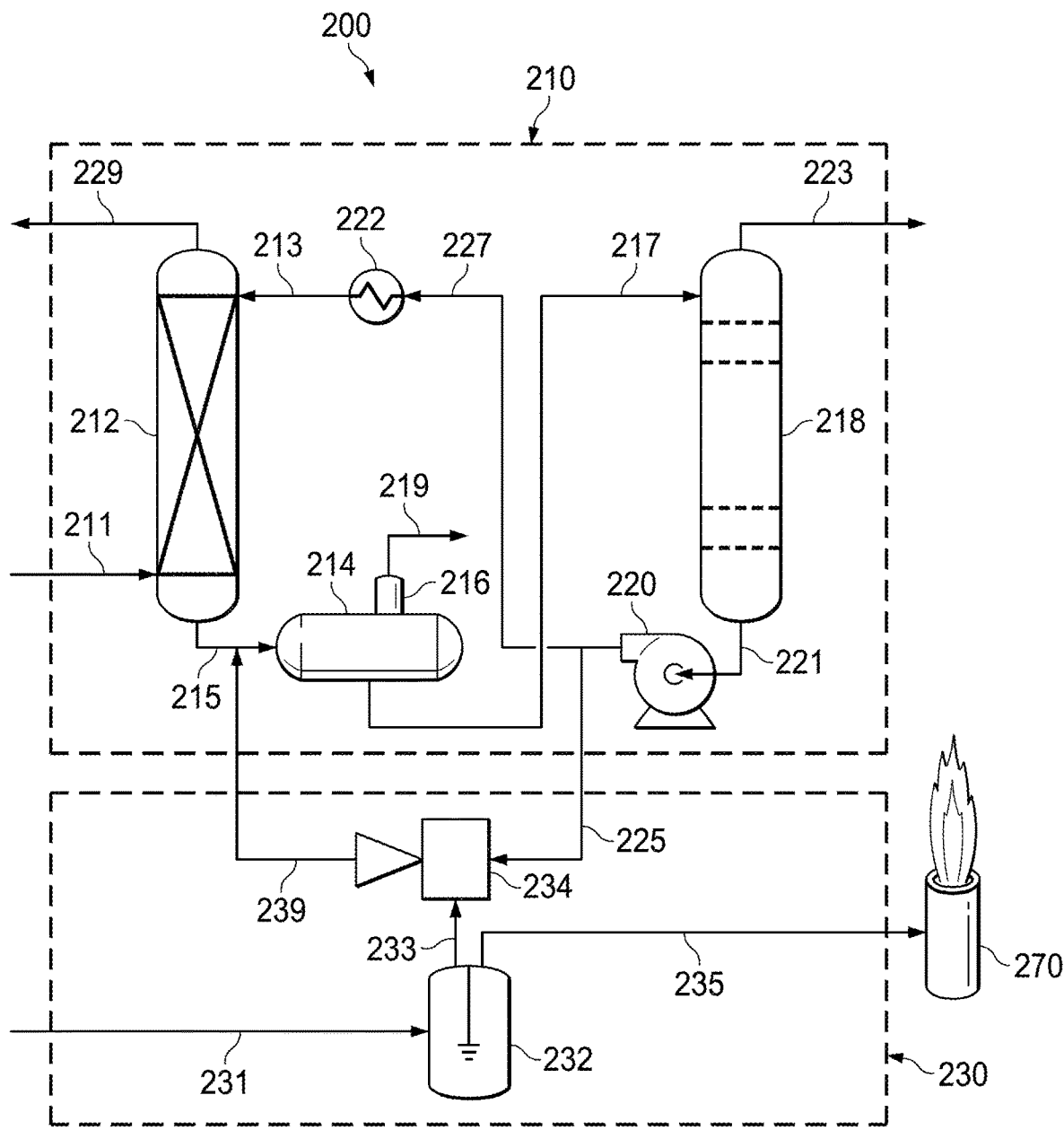
FIG. 2 is a schematic diagram of another example system that integrates a flare gas recovery unit with a gas sweetening unit, where the flare gas is recovered from a main flare header.

FIG. 2 provides a general schematic of a second exemplary system 200 that includes a gas sweetening unit 210 and flare gas recovery system 230. As depicted in FIG. 2, the sweetening unit 210 is substantially the same as the sweetening unit 110 of FIG. 1, but the configuration of the flare gas recovery system 230 differs from the flare gas recovery system 130 of FIG. 1. Like element numbers across the figures can be substantially the same; for example, the amine contactors 212 and 312 can be substantially the same as the amine contactor 112. The ejector 234 can be installed near the flare header 231 and utilize amine solvent 225 from a nearby gas sweetening unit, such as the primary gas sweetening unit 210, as motive fluid to mix with and pressurize flare gas 233. The two-phase mixture from the ejector 234 can be recycled back to the primary gas sweetening unit 210 and discharged directly back to a flash drum 214 via stream 239. The vapor phase can be separated from liquid phase in the flash drum 214 because the both the liquid and gas from the ejector 234 are recycled back to the gas sweetening unit 210. Because flare gas is being recovered and recycled to the gas sweetening unit 210, downstream units can require modification to accommodate the increased vapor flow—for example, flash drum tower 216. The recovered flare gas can then be utilized as fuel, vented, flared, or a combination of these.

Figure 3:
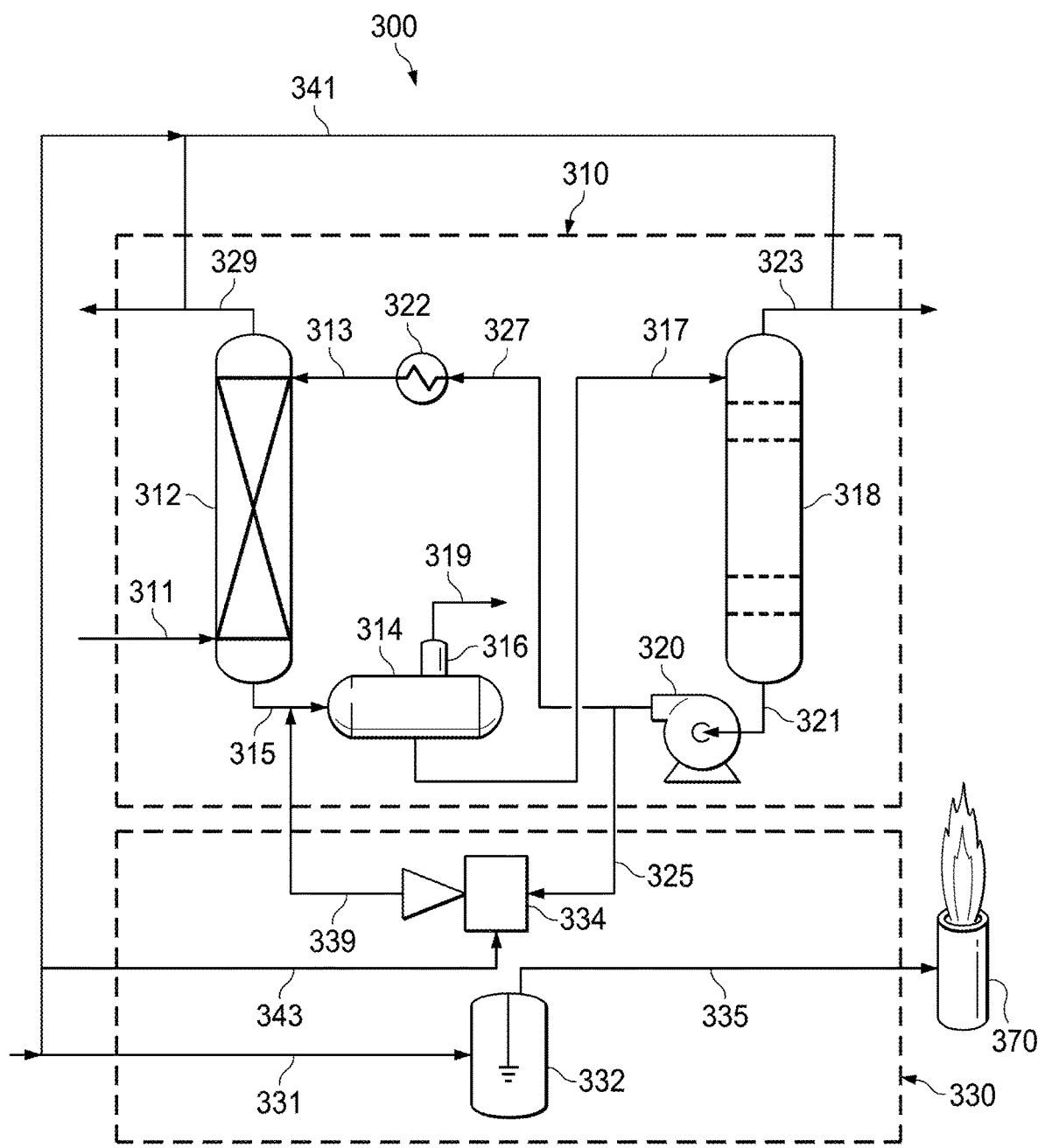
FIG. 3 is a schematic diagram of another example system that integrates a flare gas recovery unit with a gas sweetening unit, where the flare gas is recovered from the gas sweetening unit.

FIG. 3 provides a general schematic of a third exemplary system 300 that includes a gas sweetening unit 310 and flare gas recovery system 330. As depicted in FIG. 3, the sweetening unit 310 is substantially the same as the sweetening unit 110 of FIG. 1, but the configuration of the flare gas recovery system 330 differs from the flare gas recovery system 130 of FIG. 1. The ejector 334 can be installed near a gas sweetening unit, such as the gas sweetening unit 310, and utilize amine solvent 325 from the gas sweetening unit 310 as motive fluid to mix with and pressurize waste gas 343 from the gas sweetening unit 310. The two-phase mixture from the ejector 334 can be recycled back to the gas sweetening unit 310 and discharged directly back to a flash drum 314 via stream 339. For example, FIG. 3 shows a certain implementation in which the suction gas of the ejector 334 is supplied by emergency valves from the gas sweetening unit 310 via stream 341. Some or all of the losses from the unit can immediately be recovered before reaching a flare header 331. Although the configuration is different, the source of flare gas to the ejector 334 is still upstream of the flashback prevention 332.

In some implementations, an additional circulation pump is included to provide adequate flow of amine solvent from the primary gas sweetening unit 110 (or analogous 210, 310) which is being utilized as motive fluid for the ejector 134 (or analogous 234, 334).

Referring to the exemplary system 100 in FIG. 1, in one example of the systems described in this document, the amine contactor 112 of the primary gas sweetening unit 110 can operate at approximately 980 psig. The lean amine solvent from the amine cooler 122 can enter the contactor 112 at approximately 140° F., and the sweet gas (stream 129) exits the contactor 112 at approximately 120° F. The flash drum 114 can operate at approximately 80 psig and receives liquid from the bottom of the contactor 112 and the bottom of the separator 136 from the flare gas recovery system 130. The flashed vapor can travel up the flash drum tower 116 and be sent to boilers, where the gas is burned to provide heat for another process. The liquid from the flash drum 114 can be sent to the amine stripper 118 with a bottom operating pressure of approximately 15 psig and a bottom operating temperature of approximately 265° F. The circulation pump 120 can normally circulate at approximately 9500 gpm with a discharge pressure of approximately 990 psig. Approximately 7000 gpm of the amine solvent can be circulated back to the contactor 112 through cooler 122, 1200 gpm can be sent to the ejector 134 of the flare gas recovery system 130, and the balance can be recycled back to the suction of circulation pump 120.

In some embodiments, a portion of the flare gas from the flare header 131 can be sent to the ejector 134, upstream of the seal drum 132, which is utilized for flashback prevention and liquid knockout. The amine solvent and flare gas can be mixed within ejector 134 and discharged at approximately 210 psig. The vapor-liquid mixture 137 can be sent to separator 136, where the liquid 141 at the bottom is sent back to the primary gas sweetening unit 110, and the vapor 143 at the top is sent as additional feed to the secondary gas sweetening unit 150, which operates at approximately 180 psig.

The approximate flow rates and compositions of the streams can be:

| | | Stream Number* | | | | | | | | | |
|---|---|---|---|---|---|---|---|---|---|---|---|
| | units | 111 | 113 | 119 | 121 | 123 | 125 | 129 | 131 | 137 | 143 |
| Vapor flow | MMSCFD | 600 | — | 0.9 | — | 63 | — | 535 | 2 | 2 | 2 |
| Liquid flow | gpm | — | 7000 | — | 8200 | — | 1200 | — | — | 1200 | — |

-continued

|  | units | Stream Number* | | | | | | | | | |
|---|---|---|---|---|---|---|---|---|---|---|---|
|  |  | 111 | 113 | 119 | 121 | 123 | 125 | 129 | 131 | 137 | 143 |
| Vapor composition | mol % |  |  |  |  | ** |  | ** |  |  |  |
| methane |  | 70.0 | — | 91.0 | — | — | — | 78.4 | 85.5 | 90.5 | — |
| ethane |  | 6.0 | — | 5.0 | — | — | — | 6.7 | 2.0 | 2.1 | — |
| propane |  | 2.5 | — | — | — | — | — | 2.8 | — | — | — |
| i-butane |  | 0.5 | — | — | — | — | — | 0.6 | — | — | — |
| n-butane |  | 0.4 | — | — | — | — | — | 0.4 | — | — | — |
| i-pentane |  | 0.4 | — | — | — | — | — | 0.4 | — | — | — |
| n-pentane |  | 0.3 | — | — | — | — | — | 0.3 | — | — | — |
| carbon dioxide |  | 5.0 | — | — | — | 48.0 | — | — | 2.5 | — | — |
| hydrogen sulfide |  | 5.5 | — | — | — | 52.0 | — | — | 3.0 | — | — |
| nitrogen |  | 9.4 | — | 4.0 | — | — | — | 10.5 | 7.0 | 7.4 | — |
| water |  | 0.1 | — | — | — | — | — | — | — | — | — |

*Refer to FIG. 1.
**Composition is in dry basis.

Referring to the exemplary system 200 in FIG. 2, in one example of the systems described in this document, the amine contactor 212 of the gas sweetening unit 210 can operate at approximately 980 psig. The lean amine solvent from the amine cooler 222 can enter the contactor 212 at approximately 140° F., and the sweet gas (stream 229) can exit the contactor 212 at approximately 120° F. The flash drum 214 can operate at approximately 80 psig and receive In some embodiments, portion of the flare gas from the flare header 231 can be sent to the ejector 234, upstream of the seal drum 232 for flashback prevention and liquid knockout. The amine solvent and flare gas can be mixed within ejector 234 and discharged a s avapor-liquid mixture back to the flash drum 214 of the gas sweetening unit 210.

The approximate flow rates and compositions of the streams can be:

|  | units | Stream Number* | | | | | | | |
|---|---|---|---|---|---|---|---|---|---|
|  |  | 211 | 213 | 219 | 221 | 223 | 225 | 229 | 231 |
| Vapor flow | MMSCFD | 600 | — | 2.79 | — | 63 | — | 535 | 2 |
| Liquid flow | gpm | — | 7000 | — | 8200 | — | 1200 | — | — |
| Vapor composition | mol % |  |  |  |  | ** |  | ** |  |
| methane |  | 70.0 | — | 90.6 | — | — | — | 78.4 | 85.5 |
| ethane |  | 6.0 | — | 3.1 | — | — | — | 6.7 | 2.0 |
| propane |  | 2.5 | — | 0.0 | — | — | — | 2.8 | — |
| i-butane |  | 0.5 | — | — | — | — | — | 0.6 | — |
| n-butane |  | 0.4 | — | — | — | — | — | 0.4 | — |
| i-pentane |  | 0.4 | — | — | — | — | — | 0.4 | — |
| n-pentane |  | 0.3 | — | — | — | — | — | 0.3 | — |
| carbon dioxide |  | 5.0 | — | — | — | 48.0 | — | — | 2.5 |
| hydrogen sulfide |  | 5.5 | — | — | — | 52.0 | — | — | 3.0 |
| nitrogen |  | 9.4 | — | 6.3 | — | — | — | 10.5 | 7.0 |
| water |  | 0.1 | — | — | — | — | — | — | — |

*Refer to FIG. 2.
**Composition is in dry basis.

liquid from the bottom of the contactor 212 and a vapor-liquid mixture from the ejector 234 from the flare gas recovery system 230. The flashed vapor can travel up the flash drum tower 216 and be sent to boilers, where the gas is burned to provide heat for another process. The liquid from the flash drum 214 can be sent to the amine stripper 218 with a bottom operating pressure of approximately 15 psig and a bottom operating temperature of approximately 265° F. The circulation pump 220 can normally circulate at approximately 9500 gpm with a discharge pressure of approximately 990 psig. Approximately 7000 gpm of the amine solvent can be circulated back to the contactor 212 through cooler 222 such that 1200 gpm is sent to the ejector 234 of the flare gas recovery system 230 and the balance is recycled back to the suction of circulation pump 220.

Referring to the exemplary system 300 in FIG. 3, in one example of the systems described in this document, the amine contactor 312 of the gas sweetening unit 310 can operate at approximately 980 psig. The lean amine solvent from the amine cooler 322 can enter the contactor 312 at approximately 140° F., and the sweet gas (stream 329) can exit the contactor 312 at approximately 120° F. The flash drum 314 can operate at approximately 80 psig and receive liquid from the bottom of the contactor 312 and a vapor-liquid mixture from the ejector 334 from the flare gas recovery system 330. The flashed vapor can travel up the flash drum tower 316 and be sent to boilers, where the gas is burned to provide heat for another process. The liquid from the flash drum 314 can be sent to the amine stripper 318 with a bottom operating pressure of approximately 15 psig and a bottom operating temperature of approximately 265° F. The circulation pump 320 can normally circulate approximately 9500 gpm with discharge pressure of approximately 990 psig. Approximately 7000 gpm of the amine solvent can be circulated back to the contactor 312 through cooler 322 such that 190 gpm is sent to the ejector 334 of the flare gas recovery system 330, and the balance is recycled back to the suction of circulation pump 320.

Some of the flare gas from the flare header 331 is sent to the ejector 334, upstream of the seal drum 332, which is utilized for flashback prevention and liquid knockout. The ejector 334 is also lined up to receive flare gas directly from the gas sweetening unit 310, by stream 341 which is an emergency valve discharge header for the gas sweetening unit 310. In some cases, an emergency valve in the gas sweetening unit 310 can be opened and the gas can be recovered before being sent to the flare header 331. The amine solvent and flare gas can be mixed within ejector 334 and discharged as a vapor-liquid mixture back to the flash drum 314 of the gas sweetening unit 310.

The approximate flow rates and compositions of the streams can be:

|  | units | Stream Number* | | | | | | | |
|---|---|---|---|---|---|---|---|---|---|
|  |  | 311 | 313 | 319 | 321 | 323 | 325 | 329 | 341 |
| Vapor flow | MMSCFD | 600 | — | 1.25 | — | 63 | — | 535 | 0.35 |
| Liquid flow | gpm | — | 7000 | — | 8200 | — | 190 | — | — |
| Vapor composition | mol % |  |  |  |  | ** |  | ** |  |
| methane |  | 70.0 | — | 88.6 | — | — | — | 78.4 | 56.6 |
| ethane |  | 6.0 | — | 5.4 | — | — | — | 6.7 | 4.9 |
| propane |  | 2.5 | — | 0.6 | — | — | — | 2.8 | 2.0 |
| i-butane |  | 0.5 | — | — | — | — | — | 0.6 | — |
| n-butane |  | 0.4 | — | — | — | — | — | 0.4 | — |
| i-pentane |  | 0.4 | — | — | — | — | — | 0.4 | — |
| n-pentane |  | 0.3 | — | — | — | — | — | 0.3 | — |
| carbon dioxide |  | 5.0 | — | — | — | 48.0 | — | — | 13.9 |
| hydrogen sulfide |  | 5.5 | — | — | — | 52.0 | — | — | 15.1 |
| nitrogen |  | 9.4 | — | 5.4 | — | — | — | 10.5 | 7.6 |
| water |  | 0.1 | — | — | — | — | — | — | — |

*Refer to FIG. 3.
**Composition is in dry basis.

In some implementations, a filtration package can be included to remove impurities like salts or corroded materials that accumulate in the solvent used for the gas sweetening process. The filtration package can comprise a filter housing, a filter element or cartridge, an additional circulation pump, or a combination of multiples of these. Impurities collect on the filter element or cartridge as a fluid passes through the filter. The filter element or cartridge can be cleaned or replaced periodically.

Figure 4:
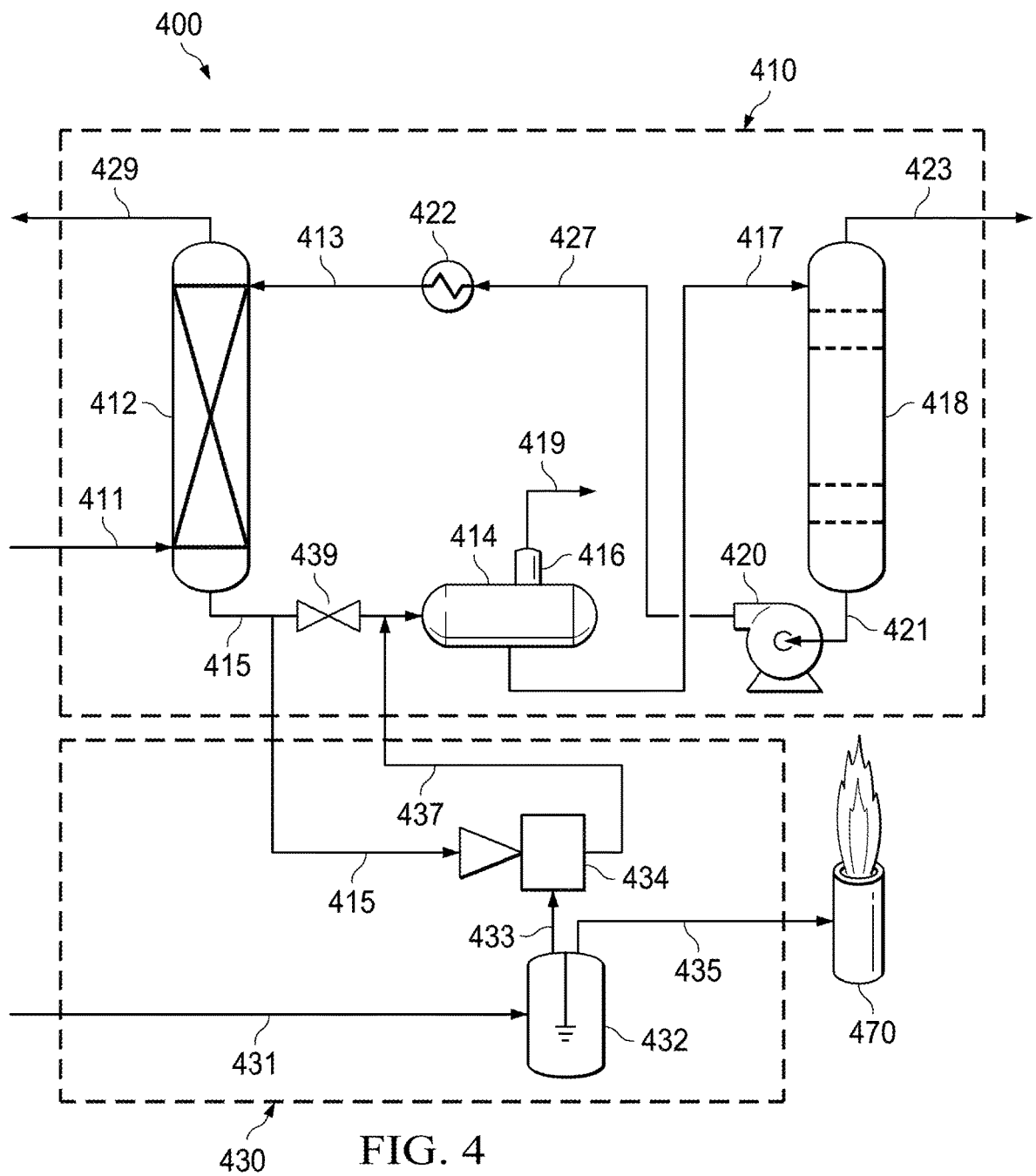
FIG. 4 is a schematic diagram of an example system that includes a flare gas recovery unit and a gas sweetening unit.

FIG. 4 depicts a general schematic of a fourth exemplary system 400 that includes a primary gas sweetening unit 410 and flare gas recovery system 430. The primary gas sweetening unit 410 of FIG. 4 comprises an amine contactor 412, a flash drum 414, an amine stripper 418, an amine circulation pump 420, and an amine cooler 422. The amine contactor 412 is a counter-flow gas-liquid contactor that can be referred as an absorber, treater, or scrubber. The amine contactor 412 is a vessel comprising internal components, which can include trays or packing, to increase gas-liquid contact.

The flash drum 414 operates at a lower pressure than the contactor 412 and allows light hydrocarbons to flash (that is, evaporate) from the amine solvent. The flash drum 414 is sized for liquid surge, liquid holdup, and residence time for vapor to separate from the liquid amine solvent. In some embodiments, the flash drum 414 is equipped with a tower 416. The flash drum tower 416 can remove acid gas such as hydrogen sulfide, which can be present in the vapor separated from the amine solvent, before the vapor is sent to another downstream process or end user.

Still referring to FIG. 4, the amine stripper 418 is a vessel, which can also be referred to as a regenerator. The amine stripper 418 comprises internal components, for example, trays or packing, and effectively serves as a distillation tower to boil off acid gas to regenerate the amine solvent. The distinction between acid gas and sour gas is that sour gas is mostly hydrocarbons with some acidic gas content, and acid gas contains little to no hydrocarbons.

The circulation pump 420 pressurizes the regenerated amine solvent to recycle the amine solvent back to the contactor 412. The circulation pump 420 can comprise a single pump or multiple pumps in parallel or in series. The circulation pump 420 can be sized to accommodate upset scenarios which require much higher flow rates than is normally required by the primary gas sweetening unit 410. The circulation pump 420, in some aspects, can employ a recycle line which routes a portion of the amine solvent back to the suction of the pump 420. Further, a booster pump (or pumps) may be positioned to pressurize the rich amine solvent 415 to the ejector 434.

The amine cooler 422 brings the temperature of the solvent down before the solvent is recycled back to the contactor 412. The lower solvent temperature increases the efficiency of cleaning the sour gas that enters the contactor 412. The cooler 422 can be a shell-and-tube heat exchanger, an air cooler, or a combination of multiples of both.

Gas sweetening units can optionally comprise auxiliary and variant equipment such as additional heat exchangers and vessels that have not been described above, but a majority of gas sweetening units across the world implement some variation or combination of the major equipment outlined.

Gas sweetening units can operate at a variety of operating temperatures and pressures. In some embodiments, sour gas at a temperature of between 70-130° F. via stream 411 enters the bottom of an amine contactor 412, as amine solvent at a temperature of between 80-140° F. via stream 413 enters from the top. The amine solvent that enters the amine contactor 412 is at least approximately 10° F. hotter than the sour gas that enters the amine contactor 412. As the amine solvent contacts the sour gas, the solvent removes (or "cleans") the sulfur compounds, carbon dioxide, and other contaminants from the sour gas, by chemical and physical binding. Once the solvent has passed through contactor 412, the solvent is considered to be in a "rich" state—also referred as "rich solvent"-because the solvent contains the hydrogen sulfide removed from the sour gas. The sweetened gas exits from the top of contactor 412 via stream 429, and rich solvent exits from the bottom via stream 415. The sweetened gas (stream 429) can contain approximately 5-60 ppm hydrogen sulfide and is sent downstream for sale or further processing.

As shown, in this example implementation, rich solvent 415 can be sent to an ejector 434 and used as a motive fluid (discussed later) for the ejector 434 prior to (or in place of) being sent to a flash drum 414 operating between atmospheric pressure to 90 psig, where any flashed vapor travels up a flash drum tower 416 and exits via stream 419, where the flashed vapor can then be utilized as fuel, vented, flared, or a combination of these.

Rich solvent liquid 417 from flash drum 414 is sent to an amine stripper 418 with a top operating pressure between 5-17 psig. The hydrogen sulfide and carbon dioxide is boiled off via heat input to the bottom of stripper 418 operating between 230-270° F. in order to regenerate the amine solvent. The regenerated solvent is then considered to be in a "lean" state—also referred as "lean solvent"—that is once again suitable to be used for cleaning additional sour gas. Sour gas 423, comprising hydrogen sulfide and carbon dioxide exits the top of stripper 418, and lean solvent 421 is pumped out of the bottom of stripper 418 by circulation pump 420. Lean solvent 427 is cooled in heat exchanger 412 to approximately 80-140° F. before re-entering contactor 412 to be used again to clean additional sour gas. The transport of vapor and liquid within, to, and from the gas sweetening unit 410 can be achieved using various piping, pump, and valve configurations.

Still referring to FIG. 4, the exemplary system 400 includes the flare gas recovery system 430 that is integrated with the gas sweetening unit 410, as described above. The system 400 utilizes liquid rich amine solvent 415 from the gas sweetening unit 410 (for example, circulated from the bottom of the contactor 412) as motive fluid for the ejector 434 in the flare gas recovery system 430.

The flare gas recovery system 430 includes the ejector 434 that comprises an inlet that continuously receives the rich amine solvent 415, which serves as a high-pressure motive fluid from the gas sweetening unit 410 via stream 415. The ejector 434 also comprises a gas inlet configured for receiving a flare gas 433 as a low-pressure suction fluid. The motive fluid operates at a higher pressure than the suction fluid. For example, the rich amine solvent (motive fluid) operates at approximately 990 psig, and the flare gas (suction fluid) operates at approximately 0.5 psig. The motive and suction fluid mix within the ejector 434, and then discharge at an intermediate pressure. Because the motive fluid is rich amine solvent 415 from the gas sweetening unit 410, the motive fluid is capable of removing hydrogen sulfide and carbon dioxide from the flare gas.

FIG. 4 shows a certain implementation in which the suction gas of the ejector 434 is supplied by a flare header 431 via stream 433. In some aspects, system 400 can include a secondary gas sweetening unit (not shown, but similar to unit 150 in FIG. 1, which includes a secondary amine contactor 152), which operates at a lower pressure than the primary gas sweetening unit 410. The ejector 434 can be installed near the flare header 431 and utilize rich amine solvent from a nearby gas sweetening unit, such as the primary gas sweetening unit 410, as motive fluid to mix with and pressurize flare gas. The two-phase mixture 437 can be discharged back to the flash drum 414, where the flashed vapor phase 419 is separated from the rich liquid phase 417 of the mixture. As shown in this example, a pressure reducing device 439, such as a valve or orifice, is positioned in the conduit for stream 415 between the take-off to, and the return from, the liquid-driven ejector 434. In some aspects, the pressure reducing device 439 may equalize (or help equalize) the pressure of the rich solvent 415 and the two-phase mixture 437 from the ejector 434 returning to the flash drum 414.

In some aspects, the type of system shown in FIG. 4 can be applicable when there exists at least two gas sweetening units operating at different pressures. In some implementations, a booster pump is included to provide adequate pressure to the rich amine solvent from the primary gas sweetening unit 410 which is being utilized as motive fluid for the ejector 434, so that the recovered flare gas can be sent to a secondary gas sweetening unit.

The flare gas recovery system 430 design takes into consideration the integrated operation with the flare 470, which includes flashback prevention 432. Flashback prevention involves preventing reverse flow of gas and potentially, the flame from the flare, as flare gas 435 is being burned at the flare 470. Flashback prevention can comprise a liquid seal drum, a molecular seal, a fluidic seal, a flame arrestor, or any combination thereof. The source of flare gas to the ejector 434 (or analogous 234, 334) is upstream of the flashback prevention 432.

Referring to the exemplary system 400 in FIG. 4, in one example of the systems described in this document, the amine contactor 412 of the primary gas sweetening unit 410 can operate at approximately 980 psig. The lean amine solvent from the amine cooler 422 can enter the contactor 412 at approximately 140° F., and the sweet gas (stream 429) exits the contactor 412 at approximately 120° F. The flash drum 414 can operate at approximately 80 psig and receives liquid from the bottom of the contactor 412 and the bottom of the separator 436 from the flare gas recovery system 430. The flashed vapor can travel up the flash drum tower 416 and be sent to boilers, where the gas is burned to provide heat for another process. The liquid from the flash drum 414 can be sent to the amine stripper 418 with a bottom operating pressure of approximately 15 psig and a bottom operating temperature of approximately 265° F. The circulation pump 420 can normally circulate at approximately 9500 gpm with a discharge pressure of approximately 990 psig. Approximately 7000 gpm of the amine solvent can be circulated back to the contactor 412 through cooler 422, 1200 gpm can be sent to the ejector 434 of the flare gas recovery system 430, and the balance can be recycled back to the suction of circulation pump 420.

In some embodiments, a portion of the flare gas from the flare header 431 can be sent to the ejector 434, upstream of the seal drum 432, which is utilized for flashback prevention and liquid knockout. The rich amine solvent and flare gas can be mixed within ejector 434 and discharged at approximately 210 psig. The vapor-liquid mixture 437 can be sent to separator 436, where the liquid 441 at the bottom is sent back to the primary gas sweetening unit 410, and the vapor 443 at the top can be sent as additional feed to a secondary gas sweetening unit, which can operate at approximately 180 psig.

The approximate flow rates and compositions of the streams can be:

| | units | Stream Number* | | | | | | | | | |
|---|---|---|---|---|---|---|---|---|---|---|---|
| | | 411 | 413 | 419 | 421 | 423 | 425 | 429 | 431 | 437 | 443 |
| Vapor flow | MMSCFD | 600 | — | 0.9 | — | 63 | — | 535 | 2 | 2 | 2 |
| Liquid flow | gpm | — | 7000 | — | 8200 | — | 1200 | — | — | 1200 | — |
| Vapor composition | mol % | | | | | ** | | ** | | | |
| methane | | 70.0 | — | 91.0 | — | — | — | 78.5 | 85.0 | 90.5 | — |
| ethane | | 6.0 | — | 5.0 | — | — | — | 6.7 | 2.0 | 2.1 | — |
| propane | | 2.5 | — | — | — | — | — | 2.8 | — | — | — |
| i-butane | | 0.5 | — | — | — | — | — | 0.6 | — | — | — |
| n-butane | | 0.4 | — | — | — | — | — | 0.4 | — | — | — |
| i-pentane | | 0.4 | — | — | — | — | — | 0.4 | — | — | — |
| n-pentane | | 0.3 | — | — | — | — | — | 0.3 | — | — | — |
| carbon dioxide | | 5.0 | — | — | — | 48.0 | — | — | 2.5 | — | — |
| hydrogen sulfide | | 5.5 | — | — | — | 52.0 | — | — | 3.0 | — | — |
| nitrogen | | 9.4 | — | 4.0 | — | — | — | 10.5 | 7.0 | 7.4 | — |
| water | | 0.1 | — | — | — | — | — | — | 1.0 | — | — |

*Refer to FIG. 4.
**Composition is in dry basis.

Figure 5:
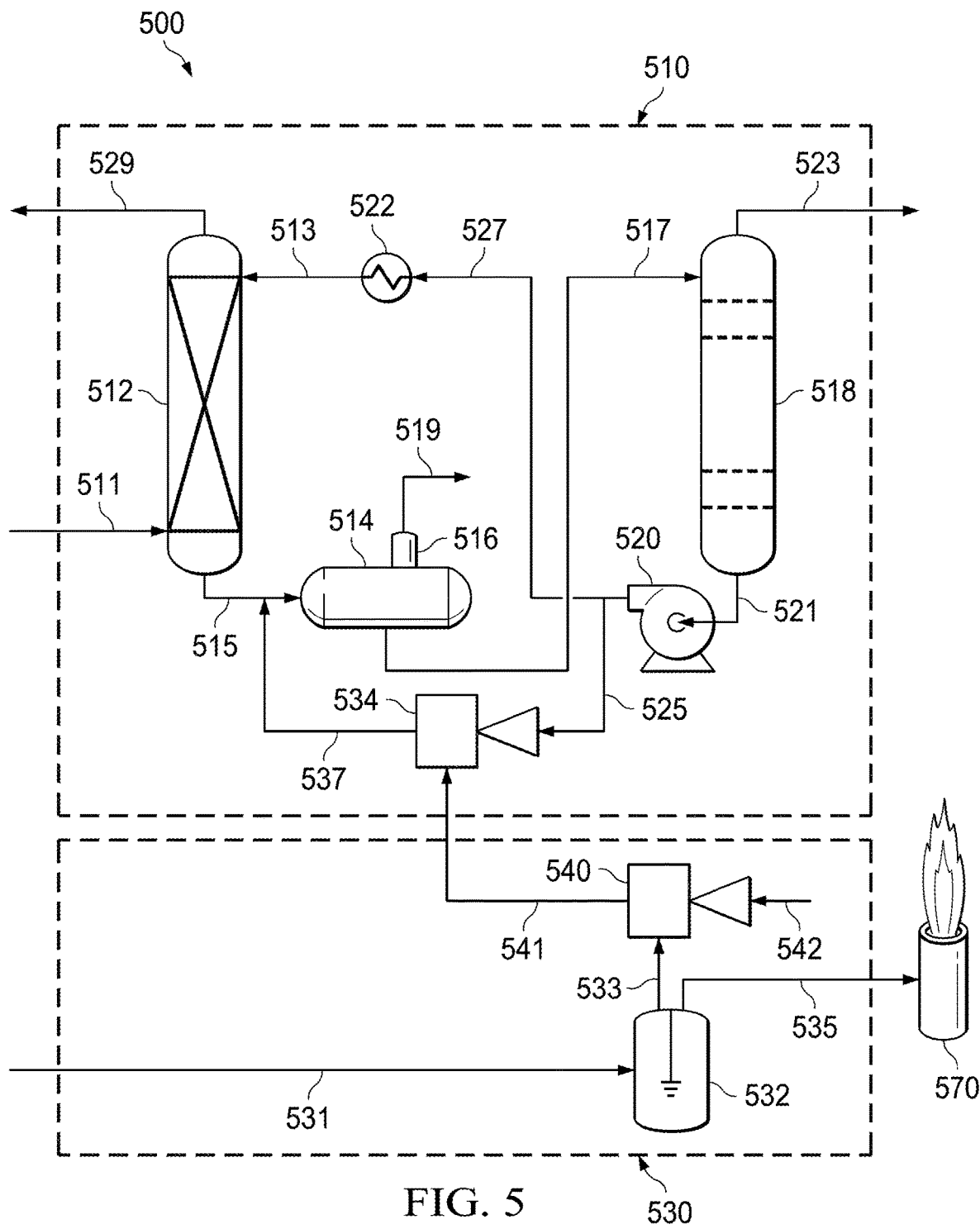
FIG. 5 is a schematic diagram of another example system that integrates a flare gas recovery unit with a gas sweetening unit, where the flare gas is recovered from a main flare header.

FIG. 5 depicts a general schematic of a fifth exemplary system 500 that includes a primary gas sweetening unit 510 and flare gas recovery system 530. The primary gas sweetening unit 510 of FIG. 5 comprises an amine contactor 512, a flash drum 514, an amine stripper 518, an amine circulation pump 520, an amine cooler 522, and an amine ejector 534. The amine contactor 512 is a counter-flow gas-liquid contactor that can be referred as an absorber, treater, or scrubber. The amine contactor 512 is a vessel comprising internal components, which can include trays or packing, to increase gas-liquid contact.

The flash drum 514 operates at a lower pressure than the contactor 512 and allows light hydrocarbons to flash (that is, evaporate) from the amine solvent. The flash drum 514 is sized for liquid surge, liquid holdup, and residence time for vapor to separate from the liquid amine solvent. In some embodiments, the flash drum 514 is equipped with a tower 516. The flash drum tower 516 can remove acid gas such as hydrogen sulfide, which can be present in the vapor separated from the amine solvent, before the vapor is sent to another downstream process or end user.

Still referring to FIG. 5, the amine stripper 518 is a vessel, which can also be referred to as a regenerator. The amine stripper 518 comprises internal components, for example, trays or packing, and effectively serves as a distillation tower to boil off acid gas to regenerate the amine solvent. The distinction between acid gas and sour gas is that sour gas is mostly hydrocarbons with some acidic gas content, and acid gas contains little to no hydrocarbons.

The circulation pump 520 pressurizes the regenerated amine solvent to recycle the amine solvent back to the contactor 512. The circulation pump 520 can comprise a single pump or multiple pumps in parallel or in series. The circulation pump 520 can be sized to accommodate upset scenarios which require much higher flow rates than is normally required by the primary gas sweetening unit 510. The circulation pump 520, in some aspects, can employ a recycle line which routes a portion of the amine solvent back to the suction of the pump 520.

The amine cooler 522 brings the temperature of the solvent down before the solvent is recycled back to the contactor 512. The lower solvent temperature increases the efficiency of cleaning the sour gas that enters the contactor 512. The cooler 522 can be a shell-and-tube heat exchanger, an air cooler, or a combination of multiples of both.

Gas sweetening units can optionally comprise auxiliary and variant equipment such as additional heat exchangers and vessels that have not been described above, but a majority of gas sweetening units across the world implement some variation or combination of the major equipment outlined.

Gas sweetening units can operate at a variety of operating temperatures and pressures. In some embodiments, sour gas at a temperature of between 70-130° F. via stream 511 enters the bottom of an amine contactor 512, as amine solvent at a temperature of between 80-140° F. via stream 513 enters from the top. The amine solvent that enters the amine contactor 512 is at least approximately 10° F. hotter than the sour gas that enters the amine contactor 512. As the amine solvent contacts the sour gas, the solvent removes (or "cleans") the sulfur compounds, carbon dioxide, and other contaminants from the sour gas, by chemical and physical binding. Once the solvent has passed through contactor 512, the solvent is considered to be in a "rich" state—also referred as "rich solvent"-because the solvent contains the hydrogen sulfide removed from the sour gas. The sweetened gas exits from the top of contactor 512 via stream 529, and rich solvent exits from the bottom via stream 515. The sweetened gas (stream 529) can contain approximately 5-60 ppm hydrogen sulfide and is sent downstream for sale or further processing. Rich solvent 515 is sent to a flash drum 514 operating between atmospheric pressure to 90 psig, where any flashed vapor travels up a flash drum tower 516 and exits via stream 519, where the flashed vapor can then be utilized as fuel, vented, flared, or a combination of these.

Rich solvent liquid 517 from flash drum 514 is sent to an amine stripper 518 with a top operating pressure between 5-17 psig. The hydrogen sulfide and carbon dioxide is boiled off via heat input to the bottom of stripper 518 operating between 230-270° F. in order to regenerate the amine solvent. The regenerated solvent is then considered to be in a "lean" state—also referred as "lean solvent"—that is once again suitable to be used for cleaning additional sour gas. Sour gas 523, comprising hydrogen sulfide and carbon dioxide exits the top of stripper 518, and lean solvent 521 is pumped out of the bottom of stripper 518 by circulation pump 520. Lean solvent 527 is cooled in heat exchanger 512 to approximately 80-140° F. before re-entering contactor 512 to be used again to clean additional sour gas. The transport of vapor and liquid within, to, and from the gas sweetening unit 510 can be achieved using various piping, pump, and valve configurations.

Still referring to FIG. 5, the exemplary system 500 includes the flare gas recovery system 530 that is integrated with the gas sweetening unit 510, as described above. The system 500 utilizes liquid amine solvent 525 from the gas sweetening unit 510 as motive fluid for the amine ejector 534 in the flare gas recovery system 530. The amine ejector 534 is positioned, in this example, within the gas sweetening unit 510.

As illustrated in FIG. 5, a flare gas ejector 540 is also included in the flare gas system 530 and comprises an inlet that continuously receives a lean or sour gas stream 542 ("gas stream 542"), which serves as a high-pressure motive fluid. The gas ejector 540 also comprises a gas inlet configured for receiving a flare gas 533 as a low-pressure suction fluid. The motive fluid operates at a higher pressure than the suction fluid. For example, the gas stream 542 (motive fluid) operates at approximately 990 psig, and the flare gas (suction fluid) operates at approximately 0.5 psig. The motive and suction fluid mix within the flare gas ejector 534, and then discharge at an intermediate pressure to the suction of the amine ejector 534 as flare gas stream 541.

FIG. 5 shows a certain implementation in which the discharge of the flare gas ejector 540 is supplied to the suction of the amine ejector 534. The amine ejector 534 comprises an inlet that continuously receives liquid amine solvent 525 from the gas sweetening unit 510, which serves as a high-pressure motive fluid. The motive fluid operates at a higher pressure than the suction fluid (flare gas stream 541). For example, the lean amine liquid solvent 525 (motive fluid) operates at approximately 990 psig, and the flare gas stream 541 (suction fluid) operates at approximately 5-10 psig. The motive and suction fluid mix within the amine ejector 534, and then discharge at an intermediate pressure to the flash drum 514.

The type of system shown in FIG. 5 can also be applicable when there exists at least two gas sweetening units operating at different pressures. In some implementations, a booster pump is included to provide adequate pressure to the amine solvent from the primary gas sweetening unit 510 which is being utilized as motive fluid for the amine ejector 534, so that the recovered flare gas can be sent to a secondary gas sweetening unit.

System 500 can include a secondary gas sweetening unit (not shown, but similar to unit 150 in FIG. 1, which includes a secondary amine contactor 152), which operates at a lower pressure than the primary gas sweetening unit 510. The amine ejector 534 can be installed near the flare header 531 and utilize lean amine solvent from a nearby gas sweetening unit, such as the primary gas sweetening unit 510, as motive fluid to mix with and pressurize flare gas.

The flare gas recovery system 530 design takes into consideration the integrated operation with the flare 570, which includes flashback prevention 532. Flashback prevention involves preventing reverse flow of gas and potentially, the flame from the flare, as flare gas 535 is being burned at the flare 570. Flashback prevention can comprise a liquid seal drum, a molecular seal, a fluidic seal, a flame arrestor, or any combination thereof. The source of flare gas to the ejector 534 (or analogous 234, 334) is upstream of the flashback prevention 532.

FIG. 5 provides a general schematic of a fifth exemplary system 500 that includes a gas sweetening unit 510 and flare gas recovery system 530. As depicted in FIG. 5, the sweetening unit 510 is substantially the same as the sweetening unit 110 of FIG. 1, but the configuration of the flare gas recovery system 530 differs from the flare gas recovery system 130 of FIG. 1. Like element numbers across the figures can be substantially the same; for example, the amine contactor 512 can be substantially the same as the amine contactor 112. The amine ejector 534 can be installed near the flare header 531 and utilize amine solvent 525 from a nearby gas sweetening unit, such as the primary gas sweetening unit 510, as motive fluid to mix with and pressurize flare gas 533. The two-phase mixture from the ejector 534 can be recycled back to the primary gas sweetening unit 510 and discharged directly back to a flash drum 514 via stream 537. The vapor phase can be separated from liquid phase in the flash drum 514, because the both the liquid and gas from the ejector 534 are recycled back to the gas sweetening unit 510. Because flare gas is being recovered and recycled to the gas sweetening unit 510, downstream units can require modification to accommodate the increased vapor flow—for example, flash drum tower 516. The recovered flare gas can then be utilized as fuel, vented, flared, or a combination of these.

In some implementations, an additional circulation pump is included to provide adequate flow of amine solvent from the gas sweetening unit 510, which is being utilized as motive fluid for the ejector 534.

Referring to the exemplary system 500 in FIG. 5, in one example of the systems described in this document, the amine contactor 512 of the gas sweetening unit 510 can operate at approximately 980 psig. The lean amine solvent from the amine cooler 522 can enter the contactor 512 at approximately 140° F., and the sweet gas (stream 529) can exit the contactor 512 at approximately 120° F. The flash drum 514 can operate at approximately 80 psig and receive liquid from the bottom of the contactor 512 and a vapor-liquid mixture from the ejector 534 from the flare gas recovery system 530. The flashed vapor can travel up the flash drum tower 516 and be sent to boilers, where the gas is burned to provide heat for another process. The liquid from the flash drum 514 can be sent to the amine stripper 518 with a bottom operating pressure of approximately 15 psig and a bottom operating temperature of approximately 265° F. The circulation pump 520 can normally circulate at approximately 9500 gpm with a discharge pressure of approximately 990 psig. Approximately 7000 gpm of the amine solvent can be circulated back to the contactor 512 through cooler 522 such that 1200 gpm is sent to the ejector 534 of the flare gas recovery system 530 and the balance is recycled back to the suction of circulation pump 520.

In some embodiments, a portion of the flare gas from the flare header 531 can be sent to the flare gas ejector 540, upstream of the seal drum 532 for flashback prevention and liquid knockout. The lean amine solvent and flare gas discharge 541 can be mixed within amine ejector 534 and discharged as a vapor-liquid mixture back to the flash drum 514 of the gas sweetening unit 510.

The approximate flow rates and compositions of the streams can be:

|  | units | Stream Number* | | | | | | | |
| --- | --- | --- | --- | --- | --- | --- | --- | --- | --- |
|  |  | 511 | 513 | 519 | 521 | 523 | 525 | 529 | 531 |
| Vapor flow | MMSCFD | 600 | — | 2.79 | — | 63 | — | 535 | 2 |
| Liquid flow | gpm | — | 7000 | — | 8200 | — | 1200 | — | — |

-continued

|  | units | 511 | 513 | 519 | 521 | 523 | 525 | 529 | 531 |
|---|---|---|---|---|---|---|---|---|---|
| Vapor composition | mol % |  |  |  |  | ** |  | ** |  |
| methane |  | 70.0 | — | 90.6 | — | — | — | 78.4 | 85.5 |
| ethane |  | 6.0 | — | 3.1 | — | — | — | 6.7 | 2.0 |
| propane |  | 2.5 | — | 0.0 | — | — | — | 2.8 | — |
| i-butane |  | 0.5 | — | — | — | — | — | 0.6 | — |
| n-butane |  | 0.4 | — | — | — | — | — | 0.4 | — |
| i-pentane |  | 0.4 | — | — | — | — | — | 0.4 | — |
| n-pentane |  | 0.3 | — | — | — | — | — | 0.3 | — |
| carbon dioxide |  | 5.0 | — | — | — | 48.0 | — | — | 2.5 |
| hydrogen sulfide |  | 5.5 | — | — | — | 52.0 | — | — | 3.0 |
| nitrogen |  | 9.4 | — | 6.3 | — | — | — | 10.5 | 7.0 |
| water |  | 0.1 | — | — | — | — | — | — | — |

*Refer to FIG. 5.
**Composition is in dry basis.

In some implementations, a filtration package can be included to remove impurities like salts or corroded materials that accumulate in the solvent used for the gas sweetening process. The filtration package can comprise a filter housing, a filter element or cartridge, an additional circulation pump, or a combination of multiples of these. Impurities collect on the filter element or cartridge as a fluid passes through the filter. The filter element or cartridge can be cleaned or replaced periodically.

Figure 6:
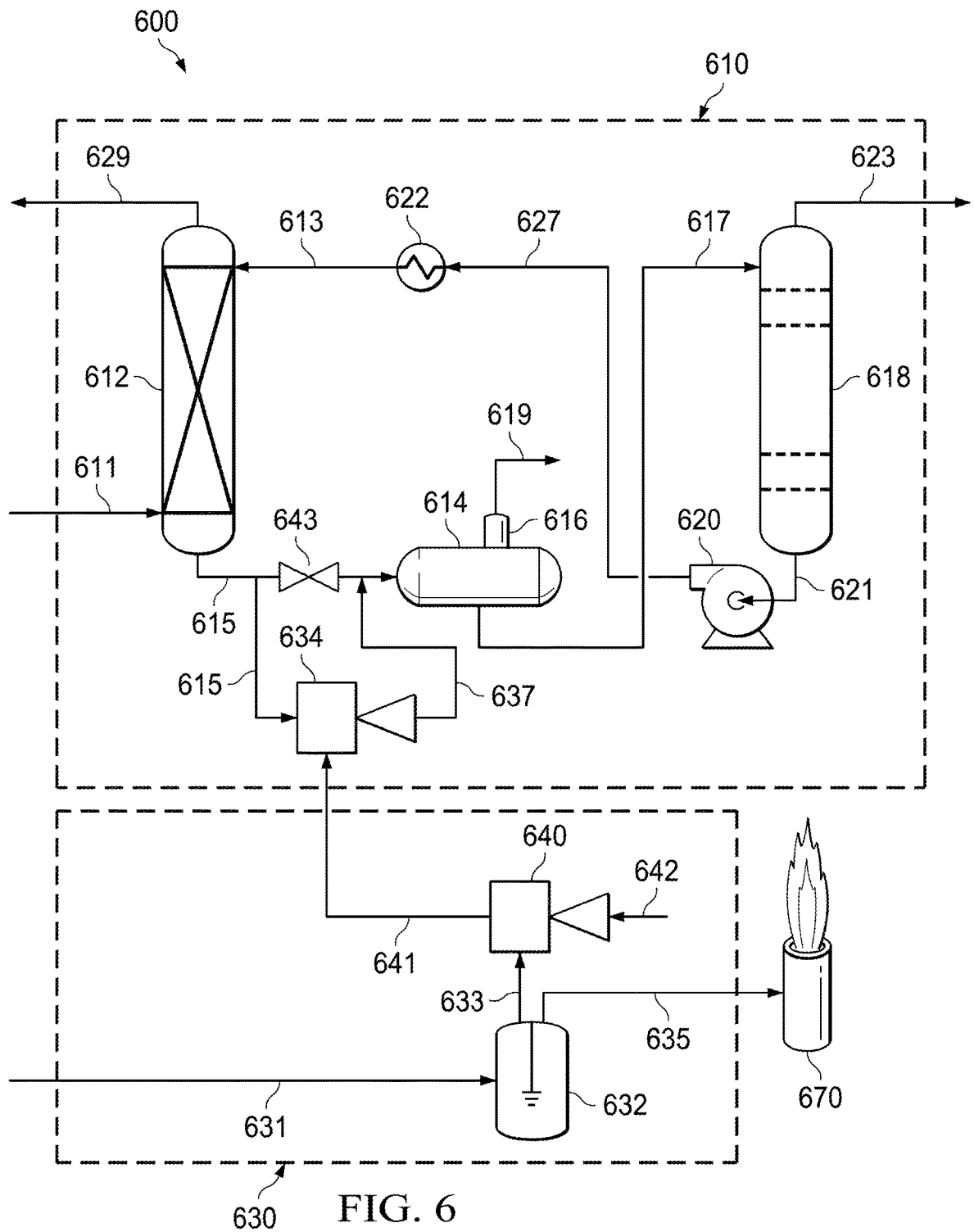
FIG. 6 is a schematic diagram of another example system that integrates a flare gas recovery unit with a gas sweetening unit, where the flare gas is recovered from a main flare header.

FIG. 6 depicts a general schematic of a sixth exemplary system 600 that includes a primary gas sweetening unit 610 and flare gas recovery system 630. The primary gas sweetening unit 610 of FIG. 6 comprises an amine contactor 612, a flash drum 614, an amine stripper 618, an amine circulation pump 620, an amine cooler 622, and an amine injector 634. The amine contactor 612 is a counter-flow gas-liquid contactor that can be referred as an absorber, treater, or scrubber. The amine contactor 612 is a vessel comprising internal components, which can include trays or packing, to increase gas-liquid contact.

The flash drum 614 operates at a lower pressure than the contactor 612 and allows light hydrocarbons to flash (that is, evaporate) from the amine solvent. The flash drum 614 is sized for liquid surge, liquid holdup, and residence time for vapor to separate from the liquid amine solvent. In some embodiments, the flash drum 614 is equipped with a tower 616. The flash drum tower 616 can remove acid gas such as hydrogen sulfide, which can be present in the vapor separated from the amine solvent, before the vapor is sent to another downstream process or end user.

Still referring to FIG. 6, the amine stripper 618 is a vessel, which can also be referred to as a regenerator. The amine stripper 618 comprises internal components, for example, trays or packing, and effectively serves as a distillation tower to boil off acid gas to regenerate the amine solvent. The distinction between acid gas and sour gas is that sour gas is mostly hydrocarbons with some acidic gas content, and acid gas contains little to no hydrocarbons.

The circulation pump 620 pressurizes the regenerated amine solvent to recycle the amine solvent back to the contactor 612. The circulation pump 620 can comprise a single pump or multiple pumps in parallel or in series. The circulation pump 620 can be sized to accommodate upset scenarios which require much higher flow rates than is normally required by the primary gas sweetening unit 610. The circulation pump 620, in some aspects, can employ a recycle line which routes a portion of the amine solvent back to the suction of the pump 620.

The amine cooler 622 brings the temperature of the solvent down before the solvent is recycled back to the contactor 612. The lower solvent temperature increases the efficiency of cleaning the sour gas that enters the contactor 612. The cooler 622 can be a shell-and-tube heat exchanger, an air cooler, or a combination of multiples of both.

Gas sweetening units can optionally comprise auxiliary and variant equipment such as additional heat exchangers and vessels that have not been described above, but a majority of gas sweetening units across the world implement some variation or combination of the major equipment outlined.

Gas sweetening units can operate at a variety of operating temperatures and pressures. In some embodiments, sour gas at a temperature of between 70-130° F. via stream 611 enters the bottom of an amine contactor 612, as amine solvent at a temperature of between 80-140° F. via stream 613 enters from the top. The amine solvent that enters the amine contactor 612 is at least approximately 10° F. hotter than the sour gas that enters the amine contactor 612. As the amine solvent contacts the sour gas, the solvent removes (or "cleans") the sulfur compounds, carbon dioxide, and other contaminants from the sour gas, by chemical and physical binding. Once the solvent has passed through contactor 612, the solvent is considered to be in a "rich" state—also referred as "rich solvent"-because the solvent contains the hydrogen sulfide removed from the sour gas. The sweetened gas exits from the top of contactor 612 via stream 629, and rich solvent exits from the bottom via stream 615. The sweetened gas (stream 629) can contain approximately 5-60 ppm hydrogen sulfide and is sent downstream for sale or further processing. Rich solvent 615 is sent to a flash drum 614 operating between atmospheric pressure to 90 psig, where any flashed vapor travels up a flash drum tower 616 and exits via stream 619, where the flashed vapor can then be utilized as fuel, vented, flared, or a combination of these.

As shown, in this example implementation, rich solvent 615 can be sent to the amine ejector 634 and used as a motive fluid (discussed later) for the ejector 634 prior to (or in place of) being sent to the flash drum 614 operating between atmospheric pressure to 90 psig, where any flashed vapor travels up a flash drum tower 616 and exits via stream 619, where the flashed vapor can then be utilized as fuel, vented, flared, or a combination of these.

Rich solvent liquid 617 from flash drum 614 is sent to an amine stripper 618 with a top operating pressure between 5-17 psig. The hydrogen sulfide and carbon dioxide is boiled off via heat input to the bottom of stripper 618 operating between 230-270° F. in order to regenerate the amine solvent. The regenerated solvent is then considered to be in a "lean" state—also referred as "lean solvent"—that is once again suitable to be used for cleaning additional sour gas. Sour gas 623, comprising hydrogen sulfide and carbon dioxide exits the top of stripper 618, and lean solvent 621 is pumped out of the bottom of stripper 618 by circulation pump 620. Lean solvent 627 is cooled in heat exchanger 612 to approximately 80-140° F. before re-entering contactor 612 to be used again to clean additional sour gas. The transport of vapor and liquid within, to, and from the gas sweetening unit 610 can be achieved using various piping, pump, and valve configurations.

Still referring to FIG. 6, the exemplary system 600 includes the flare gas recovery system 630 that is integrated with the gas sweetening unit 610, as described above. The system 600 utilizes liquid rich amine solvent 615 from the gas sweetening unit 610 as motive fluid for the amine ejector 634. The amine ejector 634 is positioned, in this example, within the gas sweetening unit 610. The amine ejector 634 comprises an inlet that continuously receives the rich amine solvent 615, which serves as a high-pressure motive fluid from the gas sweetening unit 610 via stream 615. The ejector 634 also comprises a gas inlet configured for receiving a stream 641 from the flare gas system 610 (as described later).

As illustrated in FIG. 6, a flare gas ejector 640 is also included in the flare gas system 630 and comprises an inlet that continuously receives a lean or sour gas stream 642 ("gas stream 642"), which serves as a high-pressure motive fluid. The gas ejector 640 also comprises a gas inlet configured for receiving a flare gas 633 as a low-pressure suction fluid. The motive fluid operates at a higher pressure than the suction fluid. For example, the gas stream 642 (motive fluid) operates at approximately 990 psig, and the flare gas (suction fluid) operates at approximately 0.5 psig. The motive and suction fluid mix within the flare gas ejector 634, and then discharge at an intermediate pressure to the suction of the amine ejector 634 as flare gas stream 641.

FIG. 6 shows a certain implementation in which the discharge of the flare gas ejector 640 is supplied to the suction of the amine ejector 634. The amine ejector 634 comprises an inlet that continuously receives liquid rich amine solvent 615 from the gas sweetening unit 610, which serves as a high-pressure motive fluid. The motive fluid operates at a higher pressure than the suction fluid (flare gas stream 641). For example, the rich amine liquid solvent 615 (motive fluid) operates at approximately 990 psig, and the flare gas stream 641 (suction fluid) operates at approximately 5-10 psig. The motive and suction fluid mix within the amine ejector 634, and then discharge at an intermediate pressure to the flash drum 614.

The type of system shown in FIG. 6 can also be applicable when there exists at least two gas sweetening units operating at different pressures. In some implementations, a booster pump is included to provide adequate pressure to the amine solvent from the primary gas sweetening unit 610 which is being utilized as motive fluid for the amine ejector 634, so that the recovered flare gas can be sent to a secondary gas sweetening unit.

System 600 can include a secondary gas sweetening unit (not shown, but similar to unit 150 in FIG. 1, which includes a secondary amine contactor 152), which operates at a lower pressure than the primary gas sweetening unit 610. The amine ejector 634 can be installed near the flare header 631 and utilize rich amine solvent from a nearby gas sweetening unit, such as the primary gas sweetening unit 610, as motive fluid to mix with and pressurize flare gas.

The flare gas recovery system 630 design takes into consideration the integrated operation with the flare 670, which includes flashback prevention 632. Flashback prevention involves preventing reverse flow of gas and potentially, the flame from the flare, as flare gas 635 is being burned at the flare 670. Flashback prevention can comprise a liquid seal drum, a molecular seal, a fluidic seal, a flame arrestor, or any combination thereof. The source of flare gas to the ejector 634 (or analogous 234, 334) is upstream of the flashback prevention 632.

FIG. 6 provides a general schematic of a sixth exemplary system 600 that includes a gas sweetening unit 610 and flare gas recovery system 630. As depicted in FIG. 6, the sweetening unit 610 is substantially the same as the sweetening unit 110 of FIG. 1, but the configuration of the flare gas recovery system 630 differs from the flare gas recovery system 130 of FIG. 1. Like element numbers across the figures can be substantially the same; for example, the amine contactor 612 can be substantially the same as the amine contactor 112. The amine ejector 634 can be installed near the flare header 631 and utilize rich amine solvent 615 from a nearby gas sweetening unit, such as the primary gas sweetening unit 610, as motive fluid to mix with and pressurize flare gas 641. The two-phase mixture from the ejector 634 can be recycled back to the primary gas sweetening unit 610 and discharged directly back to a flash drum 614 via stream 637. The vapor phase can be separated from liquid phase in the flash drum 614, because the both the liquid and gas from the ejector 634 are recycled back to the gas sweetening unit 610. Because flare gas is being recovered and recycled to the gas sweetening unit 610, downstream units can require modification to accommodate the increased vapor flow—for example, flash drum tower 616. The recovered flare gas can then be utilized as fuel, vented, flared, or a combination of these.

As shown in this example, a pressure reducing device 643, such as a valve or orifice, is positioned in the conduit for stream 615 between the take-off to, and the return from, the liquid-driven amine ejector 634. In some aspects, the pressure reducing device 643 may equalize (or help equalize) the pressure of the rich solvent 615 and the two-phase mixture 637 from the ejector 634 returning to the flash drum 614.

In some implementations, an additional circulation pump is included to provide adequate flow of amine solvent from the gas sweetening unit 610, which is being utilized as motive fluid for the ejector 634.

Referring to the exemplary system 600 in FIG. 6, in one example of the systems described in this document, the amine contactor 612 of the gas sweetening unit 610 can operate at approximately 980 psig. The lean amine solvent from the amine cooler 622 can enter the contactor 612 at approximately 140° F., and the sweet gas (stream 629) can exit the contactor 612 at approximately 120° F. The flash drum 614 can operate at approximately 80 psig and receive liquid from the bottom of the contactor 612 and a vapor-liquid mixture from the ejector 634 from the flare gas recovery system 630. The flashed vapor can travel up the flash drum tower 616 and be sent to boilers, where the gas is burned to provide heat for another process. The liquid from the flash drum 614 can be sent to the amine stripper 618 with a bottom operating pressure of approximately 15 psig and a bottom operating temperature of approximately 265° F. The circulation pump 620 can normally circulate at approximately 9500 gpm with a discharge pressure of approximately 990 psig. Approximately 7000 gpm of the amine solvent can be circulated back to the contactor 612 through cooler 622 such that 1200 gpm is sent to the ejector 634 of the flare gas recovery system 630 and the balance is recycled back to the suction of circulation pump 620.

In some embodiments, a portion of the flare gas from the flare header 631 can be sent to the flare gas ejector 640, upstream of the seal drum 632 for flashback prevention and liquid knockout. The rich amine solvent 615 and flare gas discharge 641 can be mixed within amine ejector 634 and discharged as a vapor-liquid mixture back to the flash drum 614 of the gas sweetening unit 610.

The approximate flow rates and compositions of the streams can be:

|  | units | Stream Number* | | | | | | | |
| --- | --- | --- | --- | --- | --- | --- | --- | --- | --- |
|  |  | 611 | 613 | 619 | 621 | 623 | 627 | 629 | 631 |
| Vapor flow | MMSCFD | 600 | — | 2.79 | — | 63 | — | 535 | 2 |
| Liquid flow | gpm | — | 7000 | — | 8200 | — | 1200 | — | — |
| Vapor composition | mol % |  |  |  |  | ** |  | ** |  |
| methane |  | 70.0 | — | 90.6 | — | — | — | 78.4 | 85.5 |
| ethane |  | 6.0 | — | 3.1 | — | — | — | 6.7 | 2.0 |
| propane |  | 2.5 | — | 0.0 | — | — | — | 2.8 | — |
| i-butane |  | 0.5 | — | — | — | — | — | 0.6 | — |
| n-butane |  | 0.4 | — | — | — | — | — | 0.4 | — |
| i-pentane |  | 0.4 | — | — | — | — | — | 0.4 | — |
| n-pentane |  | 0.3 | — | — | — | — | — | 0.3 | — |
| carbon dioxide |  | 5.0 | — | — | — | 48.0 | — | — | 2.5 |
| hydrogen sulfide |  | 5.5 | — | — | — | 52.0 | — | — | 3.0 |
| nitrogen |  | 9.4 | — | 6.3 | — | — | — | 10.5 | 7.0 |
| water |  | 0.1 | — | — | — | — | — | — | — |

*Refer to FIG. 6.
**Composition is in dry basis.

In some implementations, a filtration package can be included to remove impurities like salts or corroded materials that accumulate in the solvent used for the gas sweetening process. The filtration package can comprise a filter housing, a filter element or cartridge, an additional circulation pump, or a combination of multiples of these. Impurities collect on the filter element or cartridge as a fluid passes through the filter. The filter element or cartridge can be cleaned or replaced periodically.

Various modifications, alterations, and permutations of the disclosed implementations can be made and will be readily apparent to those or ordinary skill in the art, and the general principles defined can be applied to other implementations and applications, without departing from scope of the disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Certain implementations of the subject matter have been described in this document. Other implementations are, however, within the scope of the following claims.

What is claimed is:

1. A method of supplying flare gas for a flare gas recovery system, the method comprising:
   supplying, at a first positive pressure a flow of flare gas as a suction fluid from a flashback prevention device to an ejector of the flare gas recovery system;
   supplying, at a second positive pressure that is at least two orders of magnitude greater than the first positive pressure, a continuous flow of regenerable amine solvent in a rich state as a motive liquid to the ejector from a primary gas sweetening unit that is in fluid communication with the flare gas recovery system; and
   combining the flare gas and the regenerable amine solvent in the rich state together in the ejector to form a two-phase fluid that comprises a mixture of the suction fluid and the amine solvent in a lean state at a third positive pressure between the first and second positive pressures,
   wherein the continuous flow of the regnerable amine solvent in the rich state is configured to increase pressure of the flare gas to allow for delivery of the two-phase fluid either directly or indirectly back to the primary gas sweetening unit.

2. The method of claim 1, wherein the combining of the flare gas and solvent causes removal of a portion of one or more components from the gas, the one or more components including at least one of hydrogen sulfide or carbon dioxide, by at least one of chemical binding or physical binding, thereby resulting in the two-phase fluid comprising of the solvent in the lean state and the gas suitable for one or more of gas sweetening feed, combustion, venting, and flaring.

3. The method of claim 1, further comprising filtering of the solvent to remove impurities, the impurities including corrosion particles or salts.

4. The method of claim 1, wherein supplying the solvent in rich state is provided by a pressure source, the pressure source comprising booster pumps designated for the flare gas recovery system, to meet operating conditions of a secondary gas sweetening unit.

5. The method of claim 1, wherein supplying the solvent in rich state is provided by a pressure source, the pressure source comprising circulation pumps in the primary gas sweetening unit or additional circulation pumps designated for the flare gas recovery system.

6. The method of claim 1, further comprising separating the two-phase fluid into a rich solvent liquid phase and a sweetened gas vapor phase.

7. The method of claim 6, further comprising cycling the liquid phase back to the primary gas sweetening unit, and delivering the vapor phase to a secondary gas sweetening unit.

8. The method of claim 1, wherein supplying the flow of flare gas to the ejector comprises supplying gas from a main flare header, upstream of the flashback protection device.

9. The method of claim 1, wherein supplying the flow of flare gas to the ejector comprises supplying gas from one or more of emergency valves in the primary gas sweetening unit or a main flare header, upstream of the flashback protection device.

10. A method of supplying flare gas for a flare gas recovery system, the method comprising:
supplying a flow of flare gas as a suction fluid to a flare gas ejector of the flare gas recovery system;
supplying a continuous flow of a lean gas stream or a sour gas stream as a motive fluid to the flare gas ejector;
combining the flare gas as the suction fluid, and the lean gas stream or the sour gas stream as the motive fluid, together in the flare gas ejector to form a mixed gas fluid,
supplying a flow of the mixed-gas fluid as a suction fluid to an amine ejector of a gas sweetening unit;
supplying a continuous flow of a regenerable amine liquid solvent in a lean state as a motive fluid to the amine ejector from the primary gas sweetening unit that is in fluid communication with the flare gas recovery system; and
combining the mixed-gas fluid and the regenerable amine liquid solvent in the lean state together in the amine ejector to form a two-phase fluid that comprises a mixture of the suction fluid and the regenerable amine liquid solvent in a rich state,
wherein the continuous flow of the solvent is configured to increase pressure of the mixed-gas fluid to allow for delivery of the two-phase fluid either directly or indirectly back to the primary gas sweetening unit.

11. The method of claim 10, wherein the combining of the mixed-gas fluid and solvent causes removal of a portion of one or more components from the mixed-gas, the one or more components including at least one of hydrogen sulfide or carbon dioxide.

12. The method of claim 10, further comprising filtering of the solvent to remove impurities, the impurities including corrosion particles or salts.

13. The method of claim 10, wherein supplying the solvent in the lean state is provided by a pressure source, the pressure source comprising circulation pumps in the primary gas sweetening unit or additional circulation pumps designated for the flare gas recovery system.

14. The method of claim 10, further comprising separating the two-phase fluid into a rich solvent liquid phase and a sweetened gas vapor phase.

15. The method of claim 14, further comprising cycling the liquid phase back to the primary gas sweetening unit, and delivering the vapor phase to a secondary gas sweetening unit.

16. The method of claim 15, wherein supplying the lean solvent is further assisted by an additional pressure source, the pressure source comprising booster pumps designated for the flare gas recovery system, to meet operating conditions of the secondary gas sweetening unit.

17. The method of claim 10, wherein supplying the flow of flare gas to the flare gas ejector comprises supplying gas from a main flare header, upstream of a flashback protection device.

18. The method of claim 10, wherein supplying the flow of flare gas to the flare gas ejector comprises supplying gas from one or more of emergency valves in the primary gas sweetening unit or a main flare header, upstream of a flashback protection device.

19. The method of claim 11, wherein the combining of the mixed-gas fluid and solvent comprises at least one of chemical binding or physical binding, the method further comprising:
forming, based on the combining, the two-phase fluid comprising of the solvent in the rich state and the gas suitable for one or more of gas sweetening feed, combustion, venting, or flaring.

20. The method of claim 2, wherein supplying the solvent in rich state is provided by a pressure source, the pressure source comprising booster pumps designated for the flare gas recovery system, to meet operating conditions of a secondary gas sweetening unit, and
supplying the solvent in rich state is provided by a pressure source, the pressure source comprising circulation pumps in the primary gas sweetening unit or additional circulation pumps designated for the flare gas recovery system.

* * * * *

UNITED STATES PATENT AND TRADEMARK OFFICE
CERTIFICATE OF CORRECTION

| | | |
|---|---|---|
| PATENT NO. | : 11,865,493 B2 | Page 1 of 1 |
| APPLICATION NO. | : 17/194753 | |
| DATED | : January 9, 2024 | |
| INVENTOR(S) | : Ahmed Khalifah Al Muhsen | |

It is certified that error appears in the above-identified patent and that said Letters Patent is hereby corrected as shown below:

In the Claims

In Column 26, Line 13, Claim 1, please replace "regnerable" with -- "regenerable" --

In Column 27, Line 10, Claim 10, please replace "ora" with -- "or a" --

Signed and Sealed this
Twentieth Day of February, 2024

*Katherine Kelly Vidal*

Katherine Kelly Vidal
*Director of the United States Patent and Trademark Office*